United States Patent [19]

Getson, Jr. et al.

[11] 4,204,250
[45] May 20, 1980

[54] RANGE COUNT AND MAIN MEMORY ADDRESS ACCOUNTING SYSTEM

[75] Inventors: Edward F. Getson, Jr., Lynn, Mass.; John H. Kelley, Nashua; Albert T. McLaughlin, both of Hudson, N.J.; Donald J. Rathbun, Andover, Mass.

[73] Assignee: Honeywell Information Systems Inc., Waltham, Mass.

[21] Appl. No.: 821,900

[22] Filed: Aug. 4, 1977

[51] Int. Cl.$^2$ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,504,345 | 3/1970 | Harmon et al. | 364/200 |
| 3,638,195 | 1/1972 | Brender et al. | 364/200 |
| 3,665,417 | 5/1972 | Low et al. | 364/200 |
| 3,668,645 | 6/1972 | Reymond et al. | 364/900 |
| 3,727,204 | 4/1973 | deKoe | 364/900 |
| 3,950,735 | 4/1976 | Patel | 364/200 |
| 3,993,981 | 11/1976 | Cassarino, Jr. et al. | 364/200 |
| 3,997,878 | 12/1976 | Hirvela et al. | 364/900 |

*Primary Examiner*—Joseph M. Thesz
*Attorney, Agent, or Firm*—Ronald T. Reiling; Nicholas Prasinos; Gerald E. Lester

[57] ABSTRACT

In a peripheral controller of a data processing system having a plurality of system units electrically coupled to a common communication bus for asynchronous intercommunication, an array of counters responsive to both hardware and firmware are connected in a manner to form a serial control data path. Prior to a data transfer, a serial data stream including an offset range count, a range count and a main memory address is shifted through the counters under firmware control. During a data transfer, the firmware enables the hardware control to increment the memory address and decrement the range count to accommodate the higher data transfer rates characteristic of hardware control.

4 Claims, 13 Drawing Figures

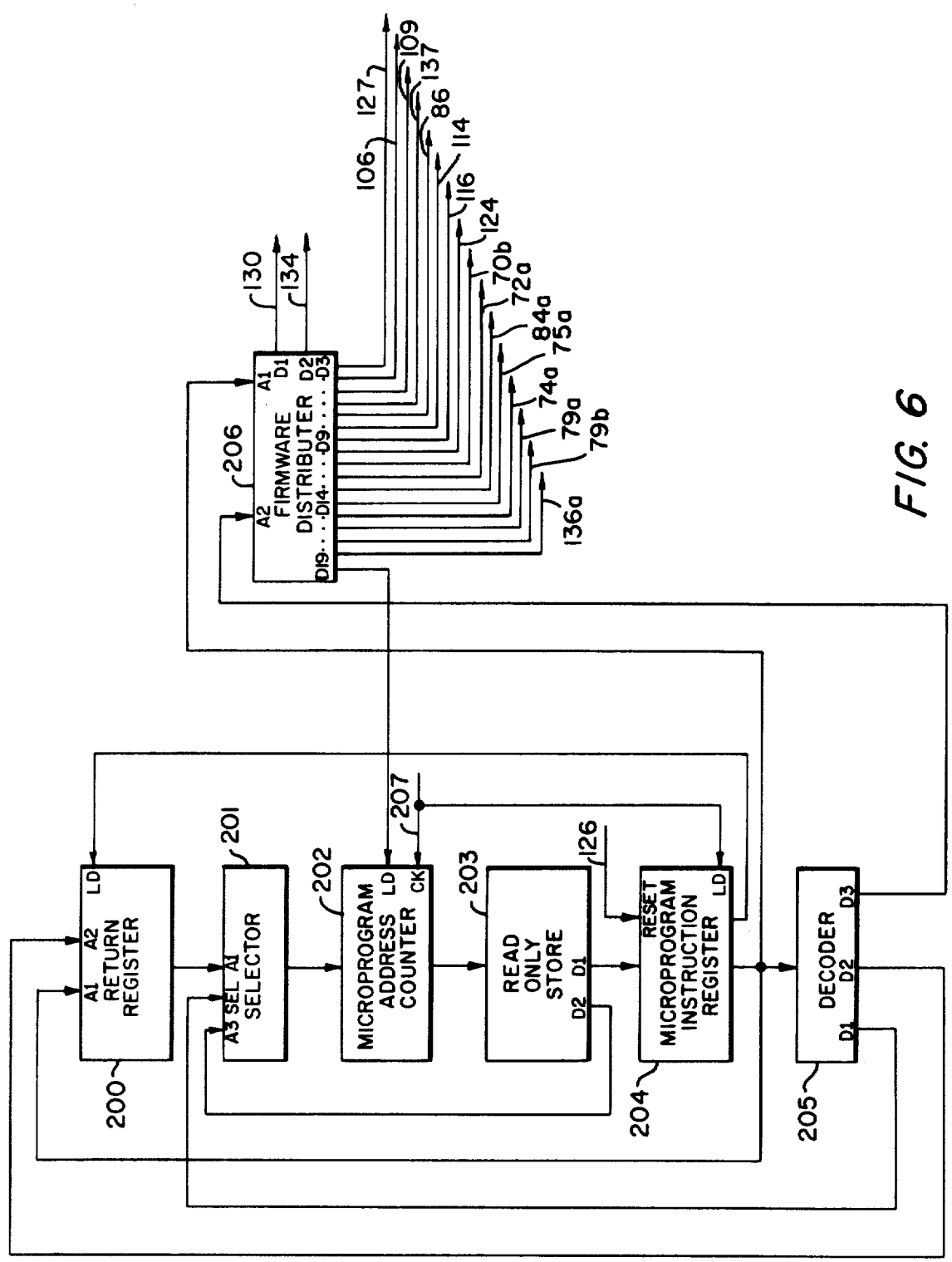

RANGE COUNT AND MAIN MEMORY ADDRESS ACCOUNTING SYSTEM

BACKGROUND OF THE INVENTION

1. Field of the Invention

The invention relates to an accounting means for tracking the flow of data between a peripheral storage device and main memory, and more particularly a data byte accounting system combining the economy and reliability of firmware with the high data transfer rates characteristic of hardware control.

2. Prior Art

Data processing systems wherein a plurality of system units are electrically coupled to a common communication bus for asynchronous intercommunication are disclosed in U.S. Pat. No. 3,993,981 and in U.S. application Ser. No. 643,439 filed Dec. 22, 1975, now U.S. Pat. No. 4,003,033 each assigned to the assignee of the present invention.

Prior data processing systems having the common bus architecture have relied solely on firmware control to accommodate data transfers between mass storage devices such as a disk and the common bus. With the incorporation of mass storage devices supplying data words at a rate of the order of ten times that of the prior transfer rates, a new control architecture was required. Further, the time penalties suffered in amending range counts and memory address data directly from a scratchpad memory could no longer be tolerated. Thus, the system data rates required a departure from the previous all firmware control architecture.

The present invention is directed to a system wherein system data control is shared between firmware and hardware in a manner to accommodate high data transfer rates.

SUMMARY OF THE INVENTION

An accounting system architecture responsive to both firmware and hardware control is provided for dynamically tracking data byte transfers.

More particularly, address counters, range counters and offset range counters are connected in a manner to form a serial data path, thereby accommodating a data load with minimal firmware interaction. A memory address, a range count and an offset range count are loaded from scratchpad memory under firmware control prior to a data transfer. The firmware control thereafter enables the hardware control to increment the address counters and decrement the range counters during the data transfer to accommodate a data transfer rate higher than that possible under firmware control.

DESCRIPTION OF THE DRAWINGS

For a more complete understanding of the present invention and for further objects and advantages thereof, references may now be had to the following description taken in conjunction with the accompanying drawings in which:

FIG. 6 is a functional block diagram of a firmware control system used in controlling the operation of the system of FIGS. 4 and 5;

DESCRIPTION OF THE PREFERRED EMBODIMENTS

FIG. 1

Figure 1:
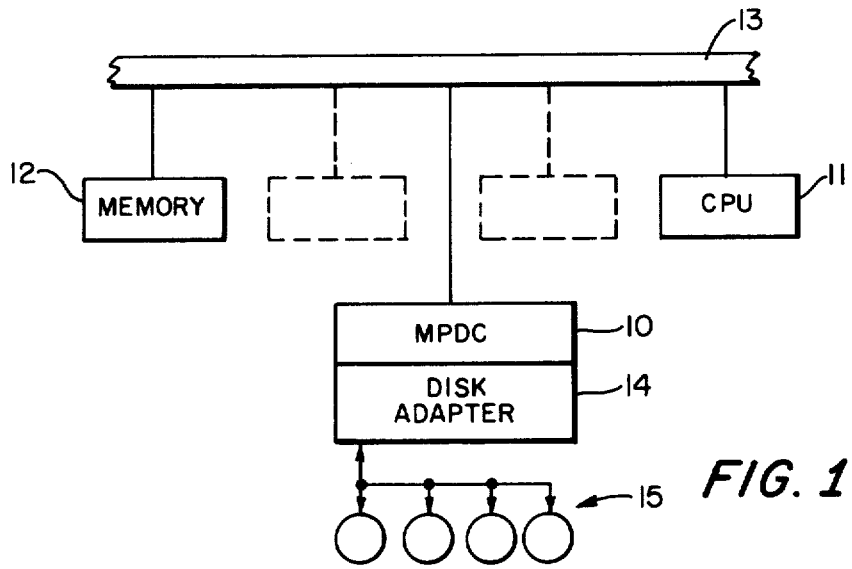
FIG. 1 is a functional block diagram of a data processing system having system units electrically coupled to a common communication bus.

FIG. 1 illustrates in functional block diagram form a computer system having a medium-performance disk controller (MPDC) 10 in electrical communication with a central processor unit 11 and a main memory unit 12 by way of a common communication bus hereinafter referred to as megabus 13. The MPDC 10 is a microprogrammed peripheral control subsystem for storing and retrieving data from mass storage media. The controller includes a Read Only Store (ROS) memory to be later described having stored therein microprogram instructions. The ROS communicates with mass storage adapters such as the device adapter 14, which has the facility to support plural daisy-chained disk devices 15.

The megabus 13 provides an information path between any two units in the system. The paths are asynchronous in design, thereby enabling units of various speeds to operate efficiently. The bus accommodates information transfers including communication requests, control commands, status signals and data transfers between main memory 12 and disk devices 15.

Any system unit requiring communication with any other system unit issues a bus cycle request. When the bus cycle is granted, the requesting unit becomes the master and the addressed system unit becomes the slave. Some bus interchanges require a response cycle as well as a request cycle. By way of example, the master unit may identify itself to a slave unit and indicate that a response is required. When the required information becomes available, the slave assumes the role of master and initiates a transfer to the requesting unit.

In the servicing of bus cycle requests, the central processor has the lowest priority, the MPDC 10 has the next to the lowest priority, and the memory 12 has the highest priority.

A more detailed background description of the system of FIG. 1 is given in U.S. Pat. No. 3,993,981 which is assigned to the assignee of the present invention, and which is incorporated by reference herein.

FIGS. 2 AND 3

Figure 2:
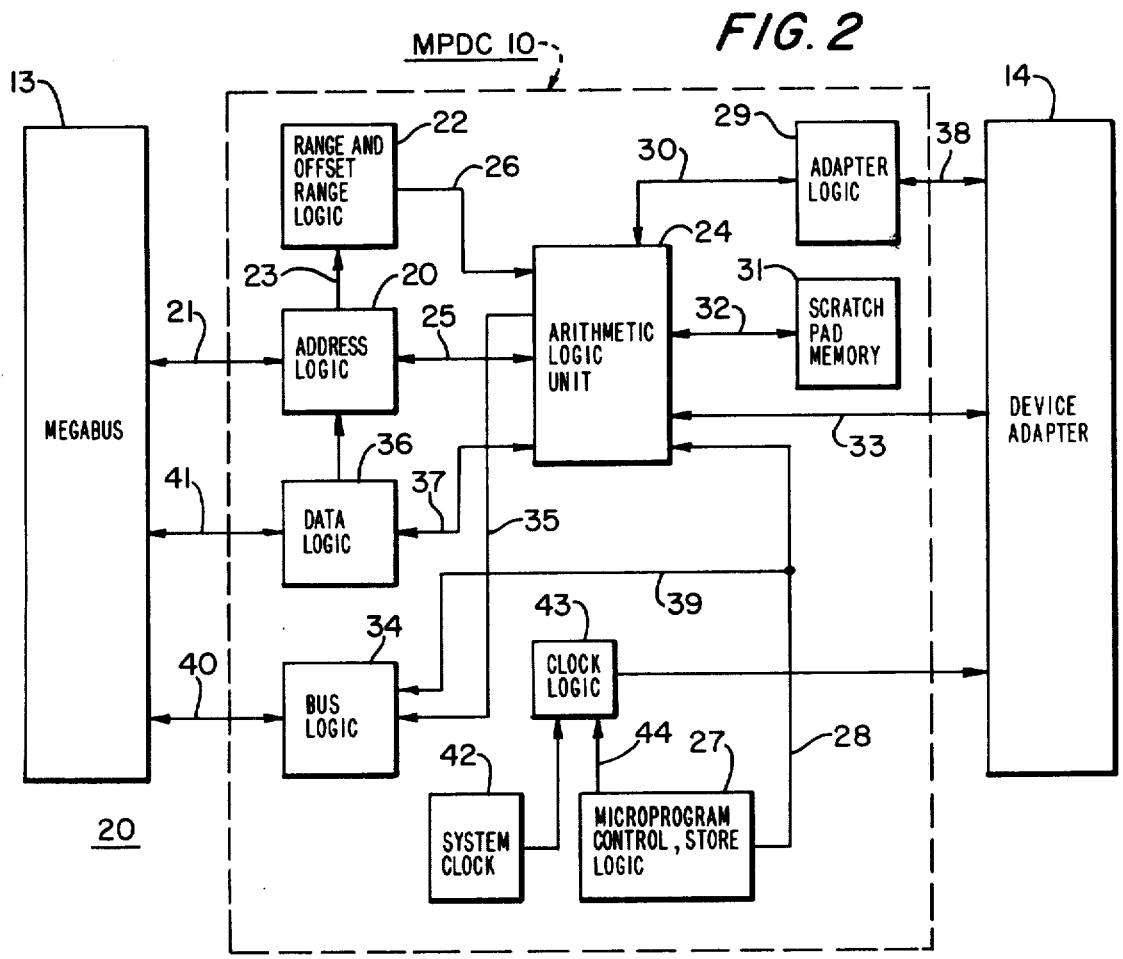
FIG. 2 is a functional block diagram of the disk controller of FIG. 1.

FIG. 2 illustrates in functional block diagram form the MPDC 10 of FIG. 1, and FIG. 3 graphically illustrates the binary instruction formats necessary for the operation of the MPDC.

The megabus 13 is connected to an address logic unit 20 by way of an address cable 21. Logic unit 20 is comprised of address transceivers through which memory addresses, channel destination numbers and function codes are transferred between the MPDC 10 and the megabus 13. The logic unit 20 further is comprised of control logic for distributing information on the address cable 21 throughout the MPDC.

Logic unit 20 is connected to a range and offset range logic unit 22 by way of a unidirectional control cable 23, and connected to an arithmetic logic unit 24 by way of a bidirectional control cable 25. The logic unit 22 includes a 16-bit range counter which is loaded with the number of bytes to be transferred during a read or write operation. The logic unit further includes a 16-bit offset range counter which is loaded with a count indicating the number of leading data bytes to be ignored during a read data transfer.

The arithmetic logic unit (ALU) 24 is the focal point of all data operations within the MPDC. Such data operations may occur between MPDC 10 and the megabus 13, or between the MPDC and the device adapter 14. The ALU performs both logic and arithmetic operations on incoming data, and is comprised of an A-operand multiplexer (AMUX), a B-operand multiplexer (BMUX), and eight-bit arithmetic unit (AU), and an eight-bit accumulator (ACU) to be further described. Under firmware control, the AMUX selects one of eight data fields and the BMUX selects one of four data fields. The AU performs 8-bit arithmetical and logical operations on the data selected by the multiplexers, and supplies the result to the accumulator for temporary storage.

The ALU receives range and offset range control signals from the logic unit 22 by way of a control cable 26, and firmware control signals from a microprogram control store logic unit 27 by way of a control cable 28. The ALU 24 further communicates with an adapter logic unit 29 by way of a bidirectional control cable 30, and with a scratchpad memory unit 31 by way of a bidirectional control cable 32. In addition, the ALU 24 communicates with the device adapter 14 by way of a bidirectional control cable 33, and supplies control information to a bus logic unit 34 by way of a unidirectional control cable 35. The ALU also receives and transfers data to a data logic unit 36 by way of a bidirectional data cable 37.

The adapter logic unit 29 is connected to the device adapter 14 by way of a bidirectional communication cable 38. The logic unit 29 provides the MPDC with a communication path to control the transfer of data and status information between the adapter 14 and the MPDC 10.

The scratchpad memory unit 31 includes logic comprised of an index register, an address register, an address selector, a scratchpad memory, and the logic elements controlling the operation of the scratchpad memory. The scratchpad memory is a 1.024K-bit by 8-bit read/write memory which is segmented into indexed and non-indexed sections, each section containing two quadrants. The non-indexed section of the memory is comprised of 256 work locations and 256 reserve locations. The indexed section of the memory is comprised of 256 locations for the storage of device-related information and 256 reserve locations. The 256 locations for device-related information are further subdivided into four sections, each comprising 64 locations per channel.

The address register of the scratchpad memory unit 31 is a 10-bit register, wherein the high order bit selects either the indexed or non-indexed mode. The second high order bit selects a 256-location quadrant, and the next two bits select 64 locations within the quadrant. The six low order bits select a scratchpad address. Data is written into the selected address of the scratchpad memory unit from the AMUX of the ALU 24 during the execution of a firmware memory write command. The data out of the scratchpad memory is delivered to the AMUX and the BMUX for distribution throughout the MPDC.

The microprogram control store logic unit 27 is typical of that known in the art, and includes a return register unit, a selector, a microprogram address counter, a Read Only Store (ROS) memory, a microprogram instruction register (MPIR), a decoder and a firmware distribution unit to be further described. The ROS provides permanent storage for resident control firmware and diagnostic microprograms, and may be addressed to select various microinstruction sequences for execution. The ROS provides a 16-bit wide output derived from the outputs of sixteen 1,024 by 4-bit programmable Read Only Memory (PROM) chips. The ROS output is applied to the MPIR which is a 16-bit wide register used to store the output of the ROS for one clock cycle during a microinstruction execution.

The bus logic unit 34 receives control signals from the ALU 24 by way of cable 35, and from the microprogram control store logic unit 27 by way of cable 28 and a control cable 39. The logic unit 34 is connected to the megabus 13 by way of a bidirectional control cable 40. The bus logic unit 34 performs asynchronous handshaking operations by responding to and generating megabus cycle requests. Further, simultaneous requests and grants of megabus cycles are accommodated on a priority basis with the MPDC at an intermediary priority position and the main memory at a position of increased priority.

The data logic unit 36 includes error checkers, five 16 word by 4-byte first-in-first-out (FIFO) data buffers and a read selector for accommodating the transfer of data or a bidirectional data cable 41 between the MPDC 10 and the megabus 13. Any information entering the MPDC 10 from the megabus 13 is gated through data transceivers and checked for parity. The same logic is used to deliver the MPDC channel number to the megabus 13 in response to a bus cycle request from a system unit. Four of the five FIFOs receive data, and the fifth FIFO is used to prevent the MPDC from making a cycle request when the data FIFOs are full. The FIFO chips are capable of stacking 14 words, plus retaining one word in the input and output registers to provide a total capacity of 16 words.

Clock signals for controlling the operation of the MPDC 10 are provided by a system clock unit 42 comprised of an 8 MHz crystal oscillator. The system clock signal is applied to a clock logic 43 which provides a 4 MHz square wave that is distributed throughout the MPDC. The clock logic unit 43 also receives control signals from the microprogram control store logic unit 27 by way of a control line 44 to enable or reset the logic unit.

The operations performed by the MPDC 10 include a direct memory access (DMA) read, a DMA write, an I/O output command, an I/O input command and an interrupt operation. Each of the operations require a single bus cycle except for the DMA read and the I/O input commands which require two bus cycles.

Figure 3A:
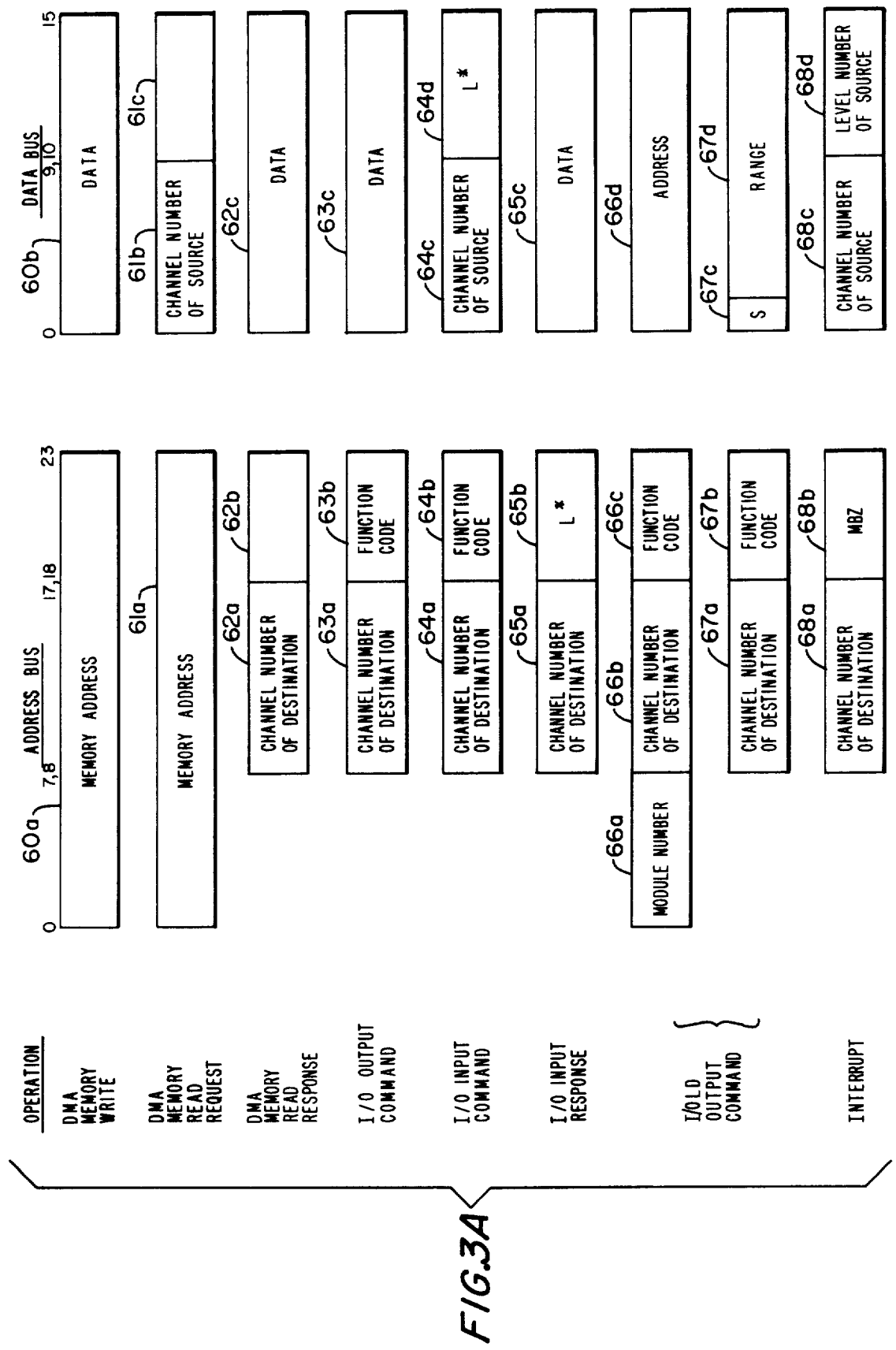
FIGS. 3A and 3B are graphical illustrations of communication words transferred through the common bus of FIG. 1.
Figure 3B:
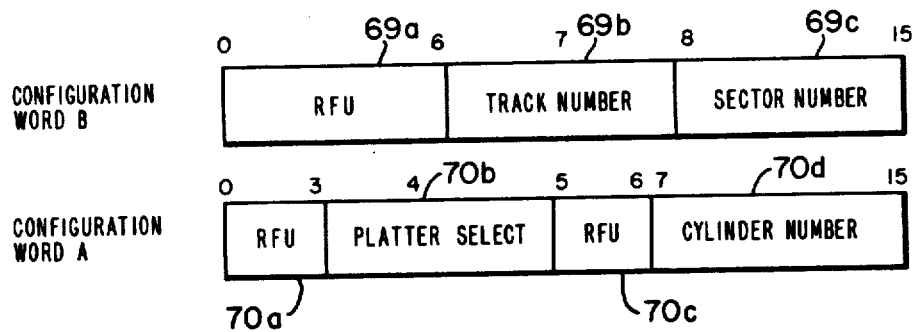

Referring to FIGS. 3a and 3b, the specific parameter formats for machine instructions used in megabus communications with the MPDC are illustrated. When a data transfer is to occur, the CPU 11 of FIG. 1 issues a machine instruction referred to as an I/O Output Command which includes a destination channel number, a 6-bit function code, and a data word as illustrated by the I/O output command format of FIG. 3a. The destination channel number identifies the system device to which a request is directed, and the function code provides the address in scratchpad memory unit 31 to which a data transfer is directed. The function code further identifies a CPU command as an input or an output command. The data word may include a task to be executed, range and offset range counts, a main memory address, or configuration words used to control the disk device during a data transfer. As shown in FIG. 3a, the destination channel numbers and function codes are transferred between the megabus 13 and the MPDC 10 by way of the address logic unit 20. The source channel number, main memory addresses, range and offset range and information stored in reserve areas are transferred between the megabus and the MPDC by way of the data logic unit 36. If data is to be written into main memory 12 of FIG. 1, the CPU 11 issues a DMA memory write operation. In response thereto, the starting memory address 60a is applied to the megabus 13 via the address cable 21, and the data 60b to be written into memory is applied to the megabus via the cable 41. As illustrated in FIG. 3a, the memory address register is a 24-bit register, while the data register is a 16-bit register.

If data is to be read from main memory 12, the CPU 11 issues a machine instruction referred to as a DMA memory read request. The instruction includes a 24-bit memory address 61a, a 10-bit source channel number 61b, and a 6-bit reserve area 61c. The memory address 61a is received from the megabus 13 via cable 21 leading to the address logic unit 20. The channel number 61b and reserve area 61c are received by the data logic unit 36 by way of data cable 41. In response to the DMA read request instruction, the MPDC issues a DMA memory read response instruction comprising a 10-bit destination channel number 62a, a 6-bit reserve area 62b, and 16 bits of data 62c to be transferred. The destination channel number and reserve area are transferred to the megabus by way of the address cable 21, while the 16 bits of data are transferred to the megabus by way of data cable 41. It is to be understood that the contents of the reserve area 62b is identical to that of the reserve area 61c. Thus, information stored by the CPU into the reserve area 61c is returned to the megabus by way of the reserve area 62b.

The CPU 11 may transfer data from main memory and indicate a task which the MPDC 10 is to perform upon the data. For example, the CPU may issue an I/O output command instruction comprising a 10-bit destination channel number 63a to identify the MPDC, a 6-bit function code 63b to identify a scratchpad memory address, and 16 bits of data 63c to be stored in the indicated scratchpad location. As before described, the destination channel number and function code are received by the address logic unit 20 by way of address cable 21, and the data is stored in the data logic unit 36. The data is transferred under firmware control from the logic unit 36 to the ALU 24, and thereafter stored in the scratchpad memory unit 31. The CPU 11 issues additional I/O output commands to store into the scratchpad a range, an offset range, a main memory address, a task to be executed and configuration words for controlling the operation of the disk device during a data transfer. The firmware further may determine from the low order bit of the function code whether the task includes an input or an output operation. The task may include any of the beforedescribed MPDC operations.

If the CPU 11 requires information from the MPDC 10, an I/O input command instruction may be issued. The instruction is comprised of a 10-bit destination channel number 64a, a 6-bit function code 64b, a 10-bit source channel number 64c identifying the source of the request, and a 6-bit reserve area 64d. In response to the CPU request, the MPDC issues an I/O input response instruction comprising a 10-bit destination channel number 65a, a 6-bit reserve area 65b having stored therein the data appearing in reserve area 64d, and 16 bits of data 65c.

When data is to be written into the scratchpad memory unit 31, a two cycle operation occurs. The CPU 11 issues an I/O load output command which is comprised of two instructions. The first instruction includes an 8-bit module number 66a indicating the high order eight bits of a main memory address, a 10-bit destination channel number 66b, a 6-bit function code 66c, and 16 address bits 66d indicating the low order bits of a 24-bit main memory address. The module number, destination channel number and function code are transferred through address logic unit 20 and ALU 24 to the scratchpad memory unit 31 under firmware control. The firmware thereafter accesses the function code in the scratchpad memory to identify the scratchpad memory address into which the main memory address data is to be written. Upon loading the address in the scratchpad memory, the firmware commands the bus logic unit 34 to issue a ready signal to the megabus 13. The CPU in response thereto issues a second instruction including a 10-bit destination channel number 67a designating the MPDC, a 6-bit function code 67b, a high order bit 67c indicating whether the range count is positive or negative, and 15 range bits 67d indicating the number of data bytes to be transferred. The firmware thereupon accesses the function code to determine the scratchpad memory locations into which the range and S bit are to be stored.

In an interrupt operation, the MPDC issues an interrupt instruction comprising a 10-bit destination channel number 68a, a 6-bit logic zero area 68b, a 10-bit source channel number 68c, and a 6-bit source priority level number 68d. When the MPDC completes an operation, the interrupt instruction is issued to the CPU 11. If the priority level number of the MPDC is higher than the priority level of the task that is currently being performed by the CPU, the MPDC interrupt will be serviced immediately. Otherwise, the MPDC enters a wait state until a CPU is received.

The formats of two configuration words used to control the operation of a disk during a data transfer are illustrated in FIG. 3b. The configuration words A and B include an image of an ID field of a disk sector on which a particular operation will be initiated. More particularly, the configuration word B includes a 7-bit area reserved for user (RFU) 69a, a 1-bit track number 69b and an 8-bit sector number 69c. The sector number field is incremented by one after each data field is successfully transferred during a read or a write operation.

Configuration word A includes a 4-bit RFU field 70a, a 1-bit platter select field 70b, a 2-bit RFU field 70c, and a 9-bit cylinder number field 70d. The cylinder number and platter select fields are used as the seek arguments for disk seek operations.

The operation of the invention may best be described in the context of a read or a write operation. If the firmware on evaluating a task word in memory unit 31 detects a command for writing a record onto a disk, the firmware accesses the configuration words A and B in memory unit 31 by way of the ALU 24. The firmware thereafter stores the words in the device adapter 14, which compares the words with track information read from the disk. During the period that the logic unit 29 is searching for an ID match, the firmware commands the bus logic unit 34 to request data from the main memory unit 12. In response thereto, the main memory transfers 32 bytes of data to the FIFOs of the data logic unit 36. As the data is being loaded into the data logic unit, the range count in logic unit 22 is decremented and the address logic unit is incremented.

When an ID match occurs, the adapter 14 initiates a write gap operation on the indicated record of the disk system. Sixteen of the 32 bytes of data in the data logic unit 36 thereupon are moved from the data logic unit 36 to the device adapter 14 by way of ALU 24. As the data is being transferred to the adapter 14, the firmware commands the bus logic unit 34 to request additional data from the memory unit 12. The above-described process continues until the range field of the logic unit 22 is exhausted.

If data is to be read from a disk device and written into main memory 12, the CPU 11 first issues machine instructions for storing configuration words A and B, range, offset range, a beginning main memory address and a task to be performed into the scratchpad memory. In response to firmware initiated control signals from the adapter logic unit 29, the device adapter 14 searches a disk device to find the data record to be transferred. When the disk track has been identified as before described, the data is transferred under hardware control to the data logic unit 36 by way of cable 33 and ALU 24. The hardware accesses the offset range count of the logic unit 22 to detect the number of leading data bytes to be ignored. The logic unit 36 thereafter forms 2-byte words from the succeeding data, and transfers a word under hardware control to the megabus 13 each time two bytes are received. The data transfer continues from the disk adapter 14 to the data logic unit 36 until the range register of the address logic unit 20 indicates that the data transfer is complete.

FIGS. 4 AND 5

Figure 4:
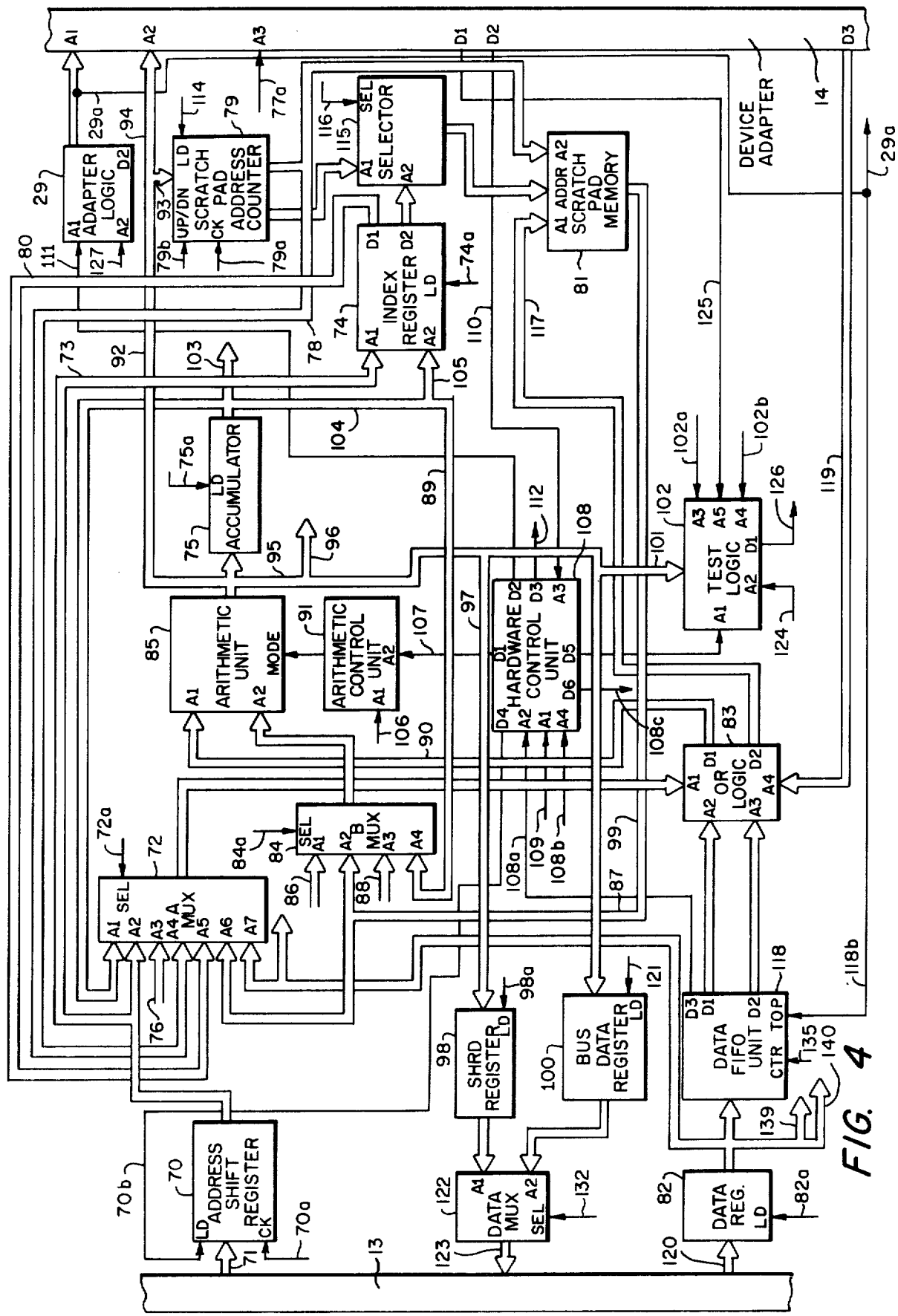
FIGS. 4 and 5 are a detailed functional block diagram of the disk controller of FIG. 1.
Figure 5:
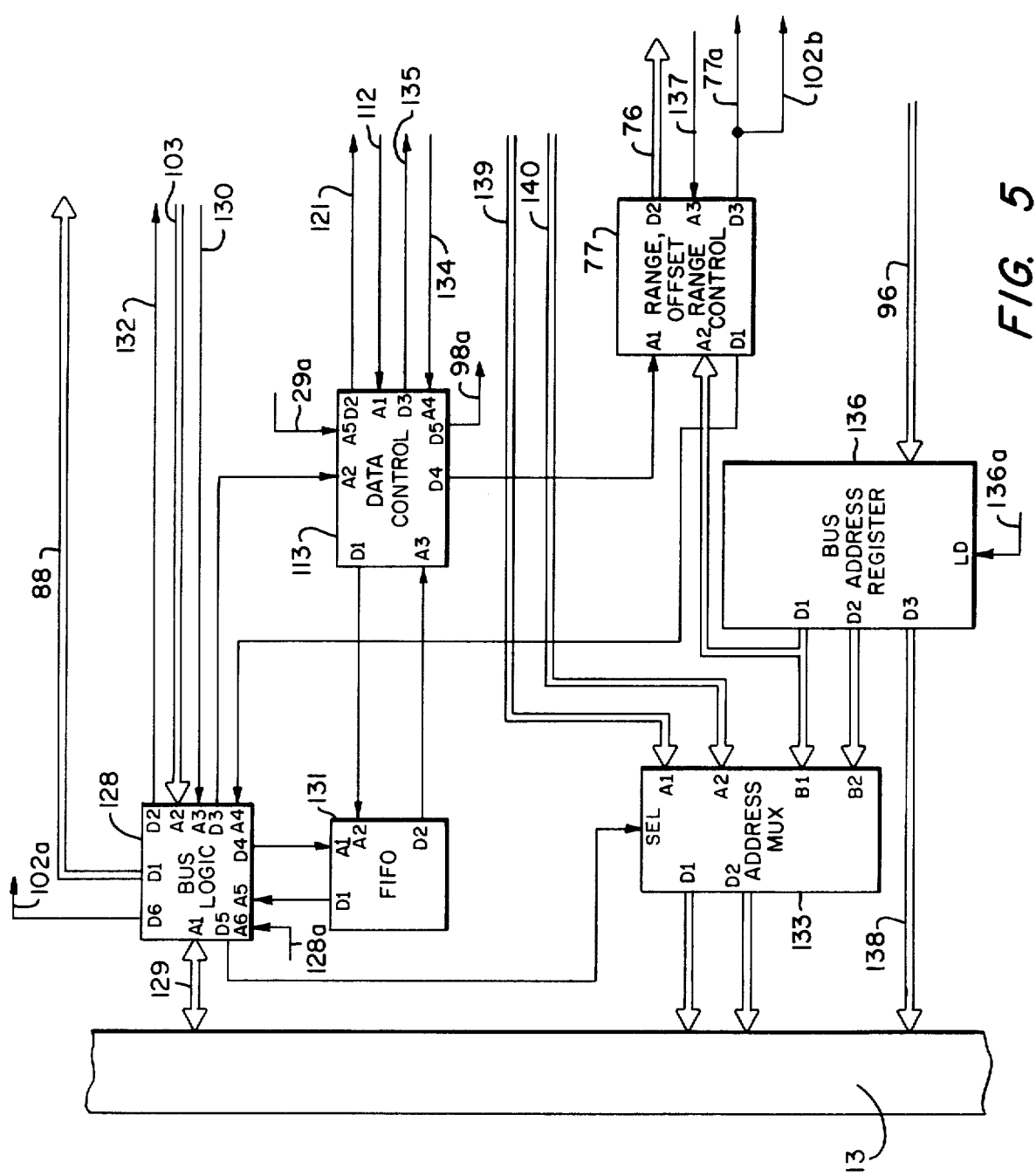

FIGS. 4 and 5 illustrate in a more detailed functional block diagram form the system of FIG. 2.

A 24-bit address shift register 70 is connected to the megabus 13 by way of a 24-bit data cable 71. The output of the shift register is applied to the A2 input of an 8 to 1 multiplexer 72 (AMUX). Bits 15 and 16 of the shift register output are applied by way of a data cable 73 to the two-bit A1 input of an index register 74. The clock (CK) input to shift register 70 is connected to a control line 70a leading to a firmware output terminal to be further described.

The A1 input to AMUX 72 is connected to the 8-bit output of an accumulator 75, and the A3 input to AMUX 72 is connected by way of a data cable 76 to the output of a range and offset range control unit 77 to be later described. The A4 input to AMUX 72 is connected by way of a data cable 78 to an output of an 8-bit scratchpad address counter 79. The A5 input to AMUX 72 is connected to a data cable 80 leading from the D1 two-bit output of index register 74, and the A6 input to AMUX 72 is connected to the 8-bit output of a 1K by 8-bit scratchpad memory 81. The A7 input to AMUX 72 is connected to the output of a 16-bit data register 82. The select (SEL) input to the AMUX 72 is connected by way of a control line 72a to a firmware output terminal. The 8-bit output of AMUX 72 is connected to the A1 input of an OR logic unit 83.

A 4-to-1 multiplexer 84 (BMUX) has an 8-bit output connected to the A2 input of an arithmetic unit 85. The A1 input to BMUX 84 is supplied by firmware on a control cable 86. The A2 input to BMUX 84 is connected to the output of scratchpad memory unit 81 by way of a data cable 87. The A3 input to BMUX 84 is supplied by way of a control cable 88, and the A4 input to the multiplexer is connected to the output of the accumulator 75 by way of a data cable 89. The select (SEL) input to the multiplexer is supplied by firmware on a control line 84a.

The A1 input to arithmetic unit 85 is connected by way of a data cable 90 to the 8-bit D1 output of logic unit 83, and the mode input to the arithmetic unit is connected to the output of an arithmetic control unit 91. The 8-bit output of the arithmetic unit is applied to the input of accumulator 75, and applied by way of data cables 92 and 93 to the data input of counter 79. Further, the output of the arithmetic unit is applied by way of data cables 92 and 94 to the A2 input of device adapter 14, and by way of data cable 95 to a data cable 96. The arithmetic unit output also is applied by way of data cables 95 and 97 to the input of a second half-read (SHRD) register 98, and by way of data cables 95 and 99 to the 8 bit data inputs of a 16-bit bus data register 100. The arithmetic unit output in addition is applied to data cables 95 and 101 leading to the data input of a test logic unit 102.

The output of accumulator 75 further is applied to a data cable 103, and to the two bit A2 input of index register 74. The load (LD) input to the accumulator is connected by way of a control line 75a to a firmware output terminal.

The A1 input of arithmetic control unit 91 is connected by way of a control line 106 to an output terminal of the firmware control system, and the A2 input to the control unit 91 is connected by way of a control line 107 to the D1 output of a hardware control unit 108.

The A1 input to control unit 108 is connected to a control line 109 leading to an output of the firmware control system, and the A2 input to the control unit 108 is connected to a control line 108a. The A3 interrupt input of control unit 108 is supplied by the device adapter 14 to a control line 110. The A4 input to the control unit is connected to a control line 108b leading from system hardware control. The D2 output of control unit 108 is connected by way of a control line 111 to the A1 input of adapter logic unit 29, and the D3 output of the control unit 108 is connected to a control line 112 leading to the A1 input of a data control unit 113. The D4 output of control unit 108 is connected by way of a control line 70b to the load (LD) input of shift register 70, and the D5 output is connected to the A1 input of test logic unit 102. The D6 output of the control unit is connected to a control line 108c leading to the system hardware control.

Firmware generated clock signals on a control line 79b are supplied to the clock (CK) input of address counter 79, and firmware control signals on a control line 114 are supplied to the LD input of the counter. Further, the up/down select input to the counter receives firmware control signals by way of a control line 79b. Two output bits of the counter are applied to the A1 input of a selector 115. The low order six bits of the counter output are applied to the A2 input of the scratchpad memory unit 81.

The A2 input of selector 115 is connected to the D2 output of index register 74, the LD input of which is supplied by firmware to a control line 74a. The 3 bit output of the selector 115 is applied to the address (ADDR) input of scratchpad memory unit 81, and the SEL input of the selector receives firmware control signals by way of a control line 116.

The A1 input to memory unit 81 is connected by way of a data cable 117 to the 8 bit D2 output of logic unit 83. The A2 input to logic unit 83 is connected to the D1 output of data FIFO unit 118, and the A3 input to logic unit 83 is connected to the D2 output of unit 118. The A4 input to logic unit 83 is supplied by the device adapter 114 by way of a data cable 119.

The data input to the data register 82 is connected to a 16 bit data cable 120 electrically connected to the megabus 13, and the output of the data register further is connected to the input of the data FIFO unit 118. The LD input to the register is supplied by hardware control on a control line 82a. The output of the register further is applied to data cables 139 and 140.

The LD input to data register 100 is supplied by data control unit 113 on a control line 121. The output of register 100 is applied to the A2 input of a 2-to-1 data multiplexer 122. The 16 bit A1 input to the multiplexer is supplied by the SHRD register 98, the LD input of which is supplied by data control unit 113 on a control line 98a. The output of the multiplexer is applied by way of a 16 bit data cable 123 to the megabus 13.

Referring to test logic unit 102, a status signal is applied to the A2 input of the logic unit by the firmware control system on a control line 124. In addition, the bus logic unit 128 supplies a status signal by way of a control line 102a to the A3 input of the logic unit 102, and the control unit 77 supplies an end of range signal to the A4 input of the logic unit by way of a control line 102b. The A5 input of logic unit 102 is connected to a control line 125 carrying interrupt signals from the D1 output of device adapter 14. The test logic unit supplies a control signal to a control line 126 leading to a firware control system to be further described.

The adapter logic unit 29 also receives a firmware signal on a control line 127 connected to its A2 input. The output of the logic unit is applied to the A1 input of device adapter 14. A control line 29a leading from the output of the logic unit is connected to the A5 input of data control unit 113, and to a control line 118b leading to the transfer on parallel (TOP) input of Data FIFO unit 118.

As illustrated by FIG. 5, the megabus 13 is connected to bus logic unit 128 by way of a bidirectional data cable 129. The A2 input of logic unit 128 is connected to data cable 103 carrying the output of accumulator 75, and the A3 input to the logic unit is connected to a control line 130 leading to an output of the firmware control system. The A4 input to logic unit 128 is connected to the D1 output of control unit 77, and the A5 input to the logic unit is connected to the D1 output of a first-in-first-out (FIFO) unit 131. The A6 input to the logic unit is supplied by system hardware on a control line 128a. The D1 output of logic unit 128 is connected to data cable 88, and the D2 output is connected to a control line 132 leading to the select (SEL) input of data multiplexer 122. The D3 output of the logic unit is connected to the A2 input of data control unit 133, and the D4 output is connected to the A1 output of FIFO unit 131. The D5 output of logic unit 128 is connected to the SEL input of a dual 2-to-1 address multiplexer 133, and the D6 output of the logic unit is connected to control line 102a.

The A2 input to FIFO unit 131 is connected to the D1 output of control unit 113, and the D2 output of the FIFO unit is connected to the A3 input of control unit 113. The A4 input to control unit 113 is connected to an output of the firmware control system by way of a control line 134, and the A5 input of the control unit is connected to line 29a. The D2 output of the control unit is connected to control line 121, and the D3 output is applied by way of a control line 135 to a control (CTR) input of data FIFO unit 118. The D4 output of data control unit 113 is applied to the A1 input of control unit 77, and the D5 output is applied to control line 98a leading to the LD input of register unit 98.

The A2 input to control unit 77 is connected to the D1 output of a bus address register unit 136, and the A3 input to the control unit is connected by way of a control line 137 to an output of the firmware control system. The D2 output of the control unit 77 is applied to data cable 76 leading to an input of AMUX 72. The D3 output of control unit 77 is applied to a control line 77a leading to the A3 input of device adapter 14, and to control line 102b leading to the A4 input of test logic unit 102 as before described.

The bus address register unit 136 is comprised of a 24-bit up counter which may be controlled to count either bytes or words, where a word is comprised of two bytes. The 8-bit D1 output of unit 136 also is applied to the B1 input of address multiplexer 133, and the 8-bit D2 output of the unit 136 is applied to the B2 input of multiplexer 133. The 8-bit D3 output of unit 136 is applied by way of a data cable 138 to the megabus 13. The LD input to the register unit 136 is supplied by firmware on a control line 136a. The 8-bit A1 and A2 inputs to address multiplexer 133 are supplied by data register 82 by way of data cables 139 and 140.

In operation, the MPDC 10 interfaces with the disk adapter 14 which in turn may service plural disk devices as illustrated in FIG. 1.

If an unsolicited bus request is received from the megabus 13, the bus logic unit 128 issues a signal on line 102a leading to the test logic unit 102. Further, a device adapter 14 request is indicated by an interrupt signal on control line 127. The logic unit thereby is notified whether a device adapter request or a megabus 13 request is to be serviced. The test logic unit 102 thereupon indicates to the firmware by way of a signal on control line 125 the microinstruction sequence to be executed. In the event that a request is directed to a disk device which is already involved in executing a task, the bus logic unit 128 will issue a not accepted (NAK) status signal to the megabus 13 under system hardware control. If a disk device not presently involved in executing a task is addressed by the megabus 13, but the MPDC is presently involved in executing a previous task involving a second disk device, then the logic unit 128 may issue a wait status signal to the megabus 13. If the disk device which is addressed is not busy, and the MPDC is not involved in servicing the device while executing a previous task, then an accept (ACK) status signal is issued to the megabus 13.

It is to be understood that in the operation of the MPDC, the data paths for a data transfer are prepared by firmware operating in combination with the system of FIGS. 4 and 5. The data transfer, however, occurs under system hardware firmware control. Detailed descriptions of such hardware may be found in U.S. Pat. No. 3,993,981, and in the following Honeywell reference manuals: MPDC Reference Manual, Doc. No. 71010241-100, Order No. FM55, Rev. 0; MPDC Cartridge Disc Adapter Reference Manual, Doc. No. 71010239-100, Order No. FM57, Rev. 0; and MPDC Disc Adapter Reference Manual, Doc. No. 71010441-100, Order No. FK90, Rev. 0.

In a read or a write operation, the CPU 11 of FIG. 1 initially supplies a channel destination number and a function code to the address shift register 70. The shift register is compared under system hardware control to a destination number set in hex rotary switches, and if a match is detected the bus logic unit 128 acknowledges the match to the bus 13. As before described, the acknowledgement may be a wait, a nonacceptance (NAK), or an acceptance (ACK). If an ACK acknowledgement is issued by the logic unit 128 to the megabus 13, the logic unit in addition issues a busy signal to the megabus 13 to place subsequent bus requests in a wait state. The system hardware thereafter controls the transfer of data between megabus 13 and MPDC 10.

In order to provide means for controlling the operation of the disk device during a read or a write operation, the CPU 11 also supplies a configuration word A to megabus 13 which under hardware control is loaded into the data register 82 and address shift register 70. Upon completing the load operation, the system hardware issues an ACK signal to the megabus 13 followed by a busy signal. Firmware senses the busy signal, and controls the transfer of the data in address shift register 70 and data register 82 through the arithmetic unit 85 for storage into scratchpad memory 81. When the firmware has completed the memory store operation, it signals the system hardware which then controls the loading of the address and data registers with a configuration word B. The configuration word B then is loaded into scratchpad memory under firmware control, and the process is repeated to receive in order a main memory address, a range count, a task and a status request. When the task is loaded into the data register 82 and stored in scratchpad memory 81, the task is executed under firmware control. Upon completing the task, the function code is interrogated to detect the presence of status requests which may be honored.

In the memory store operation, the firmware senses the function code to determine the scratchpad address in which information is to be stored from data register 82. Further, firmware is able to distinguish between data formats by interrogating the function code. A function code of hex 0 7 indicates that a task has been loaded into the scratchpad memory, a function code of hex 1 1 identifies a configuration word A and a function code of hex 1 3 identifies a configuration word B. In addition, a function code of hex O D identifies a range count (data bytes to be transferred). It is to be noted that the configuration words A and B, the task, and the range have formats as illustrated by the data field of I/O output command word of FIG. 3a. A main memory address input, however, is comprised of the module number and address fields illustrated by the I/O LD output command word of FIG. 3a.

During a read operation wherein data is read from a disk device and stored in main memory unit 12, the system hardware loads the high order bits of a main memory address, a function code and a channel destination number from megabus 13 into the address shift register 70, and loads the low order bits of the main memory address, a range or a task into the data register 82. Under firmware control, the information in the address shift register 70 is clocked through the AMUX 72 and the OR logic unit 83 to the A1 input of the arithmetic unit 85. Further, in response to a firmware command on line 106, the arithmetic control unit 91 issues a mode to the arithmetic unit 85 to select the A1 input. The A1 input to the arithmetic unit thereupon is supplied to the input of the scratchpad address counter 79, and loaded into the address counter under a firmware command supplied to control line 114.

Two bits of the address shift register output on data cable 73 are supplied to the A1 input of index register 74 to indicate the disk device from which information is to be read. Under firmware control by way of control line 74a, the two identification bits are loaded into the index register. The output of the index register is supplied to the selector 115 as is the two high-order bits of the address counter 79.

The firmware further initializes the address counter 79 by issuing an up/down signal on control line 79a, and a clock signal on control line 79b. The counter is commanded to count up or down at the rate indicated by the firmware generated clock signal. In response to the inputs from the index register and the address counter, the selector 115 addresses the scratchpad memory unit 81. The data resident in the data register 82 thus is transferred under firmware control to the scratchpad memory address indicated by selector 115 by way of a data path through the AMUX 72, the OR logic unit 83 and data cable 117. The configuration words A and B, a main memory address, a range, and a task thereby are loaded into scratchpad memory.

Upon completing the memory store operation, the firmware accesses the function code in the address shift register 70 to determine whether a task is indicated. More particularly, the firmware supplies a hex code 0 7 by way of cable 86 to the A1 input of BMUX 84. The BMUX is selected to the A1 input via a firmware control signal on control line 84a. The hex code thereupon is routed through the arithmetic unit 85 and stored in accumulator 75. Thereafter, the output of address counter 79 is channelled through the AMUX 72 and the OR logic unit 83 to the A1 input of arithmetic unit 85. Under firmware control, the arithmetic unit compares the code in the accumulator 75 with the output of the address counter 79. If a match occurs, a task is indicated and the test logic unit 102 issues a signal to the firmware by way of control line 126 to initiate the execution of a next sequence of microinstructions. In addition, the bus logic unit 128 in response to firmware control signals on line 130 sets the addressed disk device channel busy. Thereafter, any further information which is sent by way of megabus 13 to address the devices for which the present task is assigned shall be acknowledged with a NAK status signal.

Upon detecting the presence of a task, the firmware accesses the task stored in the scratchpad memory 81 and transfers that information through the AMUX 72 and OR logic unit 83 to the arithmetic unit 85. Under firmware control, the arithmetic unit 85 and the test logic unit 102 tests the task information to determine the command to be executed. For example, the task may indicate that a disk seek, a recalibrate, a read or a write operation is required. The results of these tests are supplied by the test logic unit 102 to firmware by way of control cable 126.

In a write operation wherein data is to be read from main memory unit 12 and written on a disk device, the adapter logic unit 29 under firmware control issues a strobe to the device adapter 14 to load an internal data counter with a count of four. Further, the adapter logic unit 29 is commanded to issue a sequence of four strobes to load configuration words A and B into a data buffer of the device 14. More particularly, the information is routed under firmware control from the scratchpad memory 81 through the BMUX 84 and the arithmetic unit 85 to data cables 92 and 94 leading to the device adapter 14.

Before the logic unit 29 issues a BEGIN EXECUTION command to the device adapter 14, the megabus 13 must be set up for the transfer of data. The firmware supplies two dummy bytes of offset range to the BMUX 84 by way of cable 86, and controls the transfer of the bytes through the arithmetic unit 85 and along data control 96 to the bus address register 136. The loading of the address register 136 is accomplished under firmware control on line 136a. The firmware then accesses the range information stored in the scratchpad memory unit 81, and transfer that information through the BMUX 84 and the arithmetic unit 85 to data cable 96 leading to the bus address register 136. As the range data is loaded into register 136, the offset range data is transferred to control unit 77. The two bytes of range data thereafter are transferred from the bus address register 136 into the control unit 77 under firmware control, and three bytes of address information in scratchpad memory are stored into the bus address register 136. The MPDC thereby is prepared for receiving data from main memory for writing on the indicated disk device.

To initiate a data transfer, the firmware accesses the scratchpad memory 81 to transfer the MPDC channel number previously supplied by the CPU 11, and transfer the channel number through the BMUX and arithmetic unit 85 for storage in the bus data register 100. At this time, the main memory address from which data is to be initially read resides in the bus address register 136, and the MPDC channel destination number resides in bus data register 100.

The firmware also supplies bus logic commands to the BMUX 84 by way of cable 86, and stores those commands in the accumulator 75. From the accumulator, the commands are supplied by way of data cable 103 to the bus logic unit 128. These commands in logical sequence instruct the bus logic unit 128 to issue a response-required request to main memory to acknowledge that data is to be supplied to the MPDC, to issue a main memory channel number identifying the main memory unit as the system unit addressed, and to issue an indication as to whether the MPDC is in a byte or a word mode.

In normal operation, a read or a write command is always preceded by a seek command wherein the firmware commands the adapter device 14 to position the read-write heads of the disk device. In addition, the device adapter is instructed to select the proper head from which the information is to be read or written. The device adapter 14 then compares the configuration words A and B with data read from the surface of the disk. If a match is detected which indicates that a designated record is in position, the device adapter 14 issues a write command to the disk device and begins to write a header gap on the record. During this period, the device adapter 14 also issues an interrupt by way of control line 110 to the hardware control unit 108. In response thereto, the control unit issues a signal to the A1 input of test logic unit 102 to notify firmware by way of control cable 126 that control should be turned over to the before-described system hardware. Firmware thereupon issues an enable hardware command to control line 109, and further issues commands by way of control line 134 to the data control unit 113 to control the operation of FIFO unit 131 in requesting data from memory. The FIFO unit 131 operates to anticipate the availability of space in the data FIFO unit 118 for the receipt of data word from main memory. More particularly, each time the bus logic unit 128 requests a data word from main memory, a dummy byte is loaded into the FIFO unit 131. The bus logic unit 128 thereafter requests a second word of data only if the dummy byte has dropped from the input register of the FIFO unit 131 into the FIFO stack. Main memory thereupon issues data words by way of megabus 13 to the data register 82.

When the bus logic unit 128 has requested a data word from main memory and accepted the word, the logic unit issues a signal to the A2 input of data control unit 113. In response thereto, the control unit issues a command on control line 135 to the data FIFO unit 118 to store data from the data register 82. The above-described operation is repeated until the data FIFO unit 118 is filled with 32 bytes of data.

When the data FIFOs are filled, unit 118 issues a signal by way of control lines 118a to the hardware control unit 108. Control unit 108 thereupon issues a strobe by way of control line 111 to the adapter logic unit 29. Logic unit 29 in turn issues a strobe to the device adapter 14 to indicate that a data byte may be transferred from the data FIFOs to the device adapter 14. The same strobe is applied by way of control lines 29a and 118b to the TOP (transfer out parallel) terminal of data FIFO unit 118. The D1 and D2 outputs of the FIFO unit thereupon are transferred through the OR Logic 83 and through the arithmetic unit 85 to the device adapter 14 by way of data cables 92 and 94.

The logic unit 29 strobe also is applied by way of control line 29a to the data control unit 113. The reception of two of such strobes indicates that a two-byte data word has been transferred from the data FIFO unit 118 to device adapter 14. The data control unit 113 thereupon issues a control signal to the A2 input of FIFO unit 131 to drop a dummy byte out of the output register of the FIFO stack. The input register of the FIFO unit thereby is emptied, and issues a signal to the bus logic unit 128 to initiate a request for an additional data word from main memory. The above-described process continues until the device adapter unit 14 indicates that a record has been written.

It is to be understood that the device adaptor 14 controls the write operation of the disk device. As the data is being written on the disk, the device adapter signals the test logic unit 102 by way of control line 125 to cease supplying data until the internal buffers of the device adapter have been emptied. During this period, the test logic unit 102 notifies the firmware control system that control may be transferred from the hardware to the firmware. When the device adapter 14 is ready to receive additional data, the logic state of control line 125 is changed. The test logic unit 102 thereupon notifies the firmware to return control to the hardware to resume the data transfer. This process continues until a data transfer is completed as indicated by a range count of zero.

Each time the bus logic unit 128 requests an additional data word, the data control unit 113 under system hardware control decrements the range counters of control unit 77 by one. Further, after a data request including a main memory address has been issued to the megabus 13 and accepted by the main memory unit 12, the control unit 77 increments the bus address register 136 by two and decrements the range counters by one. When the range count has been exhausted, the range control unit 77 issues an end-of-range (EOR) signal by way of control lines 77a and 102b to the device adapter 14 and the test logic unit 102, respectively.

It is to be noted that the control cable 125 includes two interrupt lines. A first interrupt line is a firmware request line to indicate that control should be returned to firmware while the device adapter 14 is between records. The second interrupt line is used to notify firmware that non-data service requests may be serviced. Such action normally indicates that there is some type of error in the device adapter 14.

If the EOR signal is issued during a record or at the end of a record on the disk device, the firmware will terminate the write order. If the EOR signal is received by the device adapter 14 before an end of record occurs, the device adapter fills the remaining portion of the record with dummy bytes. If an EOR signal does not occur, however, and there is no device adapter error indicated on interrupt cable 127, then the firmware will update the configuration words A and B in device adapter 14 to point to a next logical sector of the disk device.

FIG. 6

FIG. 6 illustrates in functional block diagram form a firmware control system for controlling the operation of the system illustrated in FIGS. 4 and 5.

The 12-bit output of a 16-bit return register 200 is connected to the A1 input input of a selector 201. The 12-bit output of the selector 201 in turn is applied to the input of a 16-bit microprogram address counter 202, and the 12-bit output of the address counter is connected to the input of a 4.0K by 16-bit Read Only Store (ROS) 203 having the microinstructions of a microprogram stored therein. The 16-bit D1 output of the ROS is connected to the input of a 16-bit microprogram instruction register 204, and the D2 output of the ROS is applied to the A3 input of the selector 201.

The microprogram instruction register 204 further receives a control signal from the test logic unit 102 of FIG. 4 by way of a control line 126 to reset or clear the register. The 16-bit output of the microprogram instruction register 204 is applied to the input of a decoder 205, to the A1 input of return register unit 200, and to the A1 input of a firmware distributor 206. A one-bit output of the register 204 is applied to the LD input of return register 200.

The D1 output of decoder 205 is applied to the A2 input of the selector 201, and the D2 output of the decoder is applied to the A2 input of return register unit 200. Further, the D3 output of decoder 205 is applied to the A2 input of distributor 206. The D1 output of the distributor is applied to control line 130 leading to the bus logic unit 128, and the D2 output is applied to control line 134 leading to the data control unit 113. The D3 output of distributor 208 is applied to control line 127 connected to the A2 input of adapter logic unit 29, and the D4 output is applied to control line 106 leading to the arithmetic control unit 91. The D5 output is supplied to control line 109 connected to the A1 input of hardware control unit 108, and the D6 output is connected to line 137 leading to the A3 input of control unit 77. The D7 output is connected to control cable 86, and the D8 output is applied to control line 114 carrying load commands to the counter 79. The D9 output is applied to control line 116, and the D10 output is applied to control line 124. The D11 output is applied to control line 70b, the D12 output to control line 72a and the D13 output to control line 84a. The D14 output is applied to line 75a, the D15 output to line 74a and the D16 output to line 79a. The D17 output is applied to line 79b and the D18 output to line 136a. The D19 output of distributor 206 is applied to the LD input of counter 202, the clock input of which is supplied by the system hardware by way of control line 207. Control line 207 further is connected to the LD input of register 204.

The 16-bit firmware commands stored in ROS 203 are divided into four fields: the OPCODE, the AMUX 72 select, the BMUX 84 selected and the mixcellaneous fields. The firmware commands further are segmented into seven categories each representative of bit configurations for performing a designated operation. The seven basic categories of firmware commands are: miscellaneous commands, bus logic commands, ALU commands, constant value data commands, memory commands, test commands, and branch commands. Each of the firmware categories is identified by a particular OPCODE which is a binary decode of bits 0, 1 and 2 of ROS 203.

In operation, the microprogram address counter 202 is loaded from selector 201 under firmware control, and thereafter clocked by hardware system control signals on line 207. The address counter addresses the ROS 203, which in response thereto supplies microinstructions to the instruction register 204. The register 204 loads the microinstructions under hardware control, and applies the microinstruction bit configuration to decoder 205, distributor 206 and return register 200.

The order in which the microinstruction sequences stored in ROS 203 are executed may be controlled in any of several ways. The test logic unit 102 may issue a reset signal causing a no-op instruction to occur in the instruction register 204. The instruction register thereupon skips the current instruction in the register, and proceeds to the next occurring instruction. In the alternative, the address counter 202 may be loaded with a microinstruction address formed from Read Only Store 203 and register 200. The firmware control system of FIG. 6 thus offers significant versatility in the execution of microprograms.

As each microinstruction addressed in ROS 203 is loaded into register 204, the instruction bit configuration and a binary code from decoder 205 identifying the instruction category are applied to distributor 206. In response thereto, the distributor applies firmware control signals to the system of FIGS. 4 and 5 as before described.

A copy of the microprogram stored in the ROS 203 is reproduced in its entirety, and attached hereto as Appendix A.

The operation of decoder 205 and firmware distributor 206 may better be understood by reference to Tables A–K. The OPCODES are defined in Table A, which provides a pointer to one of Tables B–K. For example, the OPCODE 0 0 0 refers to the miscellaneous commands of Table B. The OPCODE of 0 1 0 refers to Table C, the OPCODE 0 1 1 to Table D, the OPCODE 1 0 0 to Table E, and the OPCODE 1 0 1 to Table F.

Further, the OPCODE 1 1 0 refers to Table G and the OPCODE 1 1 1 to Table I.

Table A

| Opcode Instructions | |
|---|---|
| MICROINSTRUCTIONS | |
| 0 0 0 | MISCELLANEOUS |
| 0 0 1 | RFU |
| 0 1 0 | BUS LOGIC |
| 0 1 1 | ALU |
| 1 0 0 | CONSTANTS |
| 1 0 1 | MEMORY |
| 1 1 0 | TEST |
| 1 1 1 | BRANCH |

Table B

Miscellaneous Commands

| OPERATION | BINARY VALUE | MNEMONIC | HEX CODE |
|---|---|---|---|
| NO OPERATION | 0000000000000000 | NOP | 0000 |
| CLEAR COMMAND | 0001000000000000 | CLR | 1000 |
| SET ERROR FLOPS | 0000100000000000 | SEF | 0800 |
| ENABLE HARDWARE DATA PATH | 0000011000000000 | EHP | 0600 |
| DISABLE HARDWARE DATA PATH | 0000001000000000 | DHP | 0200 |
| RESET DIAGNOSTIC MODE | 0000000010000000 | RSD | 0080 |
| SET DIAGNOSTIC MODE | 0000000110000000 | STD | 0180 |
| HALT | 0000000001000000 | HLT | 0040 |
| RFU | 0000000000100000 | — | 0020 |
| CLEAR FLOPS AND REGISTERS | 0000000010010000 | CRF | 0010 |
| RESET DEVICE ADAPTER | 0000000010001000 | RDA | 0008 |
| SET QLT (BLT DONE) | 0000000000000100 | QLT | 0004 |
| SET BUS ACK | 0000000000000010 | SBA | 0002 |
| RFU | 0000000000000001 | — | 0001 |
| ENABLE READ PATH | 0000011000000000 | ERP | 0600 |
| ENABLE WRITE PATH | 0000011000000001 | EWP | 0601 |

Table C

Bus Logic Commands

| OPERATION | BINARY VALUE | MNEMONIC | HEX CODE |
|---|---|---|---|
| INCREMENT ADDRESS CNTR. | 0100000100000000 | IAC | 4100 |
| RESET STATUS | 0100000010000000 | RST | 4080 |
| DECREMENT RANGE CNTR. | 0100000001000000 | DRC | 4040 |
| CYCLE | 010 $A_1 A_2 A_3$ 000010000 $A_0$ | CYC | |
| SET CHANNEL READY | 0100000000011000 | SCR | 4018 |
| RESET CHANNEL READY | 0100000000010000 | RCR | 4010 |
| SET REGISTER BUSY | 0100000000000100 | SRB | 4004 |
| RESET REGISTER BUSY | 0100000000000010 | RPB | 4002 |
| RESET INTERRUPT LATCH | 0100000000000001 | RIL | 4001 |
| CLEAR BUS | 0100000010000110 | CLB | 4086 |

$A_0 A_1 A_2 A_3$ = SELECT AOP MUX INPUT.

Table D

ALU Commands

| OPERATION | BINARY VALUE | MNEMONIC | HEX CODE |
|---|---|---|---|
| AOP NEGATION | 0 1 1 $A_1 A_2 A_3 B_0 B_1$ C S 0 0 0 0 1 $A_0$ | ANT | N/A |
| BOP NEGATION | 0 1 1 $A_1 A_2 A_3 B_0 B_1$ C S 0 1 0 1 1 $A_0$ | BNT | N/A |
| ZERO ALU | 0 1 1 $A_1 A_2 A_3 B_0 B_1$ C S 0 0 1 1 1 $A_0$ | ZER | N/A |
| AOP TRANSFER | 0 1 1 $A_1 A_2 A_3 B_0 B_1$ C S 1 1 1 1 1 $A_0$ | XFA | N/A |
| BOP TRANSFER | 0 1 1 $A_1 A_2 A_3 B_0 B_1$ C S 1 0 1 0 1 $A_0$ | XFB | N/A |
| NOR A TO B | 0 1 1 $A_1 A_2 A_3 B_0 B_1$ C S 0 0 0 1 1 $A_0$ | NOR | N/A |
| NAND A TO B | 0 1 1 $A_1 A_2 A_3 B_0 B_1$ C S 0 1 0 0 1 $A_0$ | NND | N/A |
| XOR A TO B | 0 1 1 $A_1 A_2 A_3 B_0 B_1$ C S 0 1 1 0 1 $A_0$ | XOR | N/A |
| XNOR A TO B | 0 1 1 $A_1 A_2 A_3 B_0 B_1$ C S 1 0 0 1 1 $A_0$ | XNR | N/A |
| AND A TO B | 0 1 1 $A_1 A_2 A_3 B_0 B_1$ C S 1 0 1 1 1 $A_0$ | AND | N/A |
| OR A TO B | 0 1 1 $A_1 A_2 A_3 B_0 B_1$ C S 1 1 1 0 1 $A_0$ | ORR | N/A |
| AOP PLUS ONE | 0 1 1 $A_1 A_2 A_3 B_0 B_1$ C S 0 0 0 0 0 $A_0$ | INC | N/A |
| AOP MINUS ONE | 0 1 1 $A_1 A_2 A_3 B_0 B_1$ C S 1 1 1 1 0 $A_0$ | DEC | N/A |
| SUBTRACT B FROM A | 0 1 1 $A_1 A_2 A_3 B_0 B_1$ C S 0 1 1 0 0 $A_0$ | SUB | N/A |
| ADD A to B | 0 1 1 $A_1 A_2 A_3 B_0 B_1$ C S 1 0 0 1 0 $A_0$ | ADD | N/A |
| LEFT SHIFT AOP | 0 1 1 $A_1 A_2 A_2 B_0 B_1$ C S 1 1 0 0 0 $A_0$ | LSH | N/A |
| CARRY OUT IN | 0 1 1 $A_1 A_2 A_3 B_0 B_1$ 1 S X X X X X $A_0$ | COTI | N/A |

Table D-continued

| | ALU Commands | | |
|---|---|---|---|
| OPERATION | BINARY VALUE | MNEMONIC | HEX CODE |
| STORE RESULT IN AOP | 0 1 1 $A_1 A_2 A_3 B_0 B_1$ C 1 X X X X X $A_0$ | SRIA | N/A |

$A_0 A_1 A_2 A_3$ = AOP REG. SELECT
$B_0 B_1$ = BOP REG. SELECT
C = DETERMINE CARRY IN
S = DETERMINE A OR B RESULT STORAGE

Table E

| | Constant Commands | | |
|---|---|---|---|
| OPERATION | BINARY VALUE | MNEMONIC | HEX CODE |
| LOAD CONSTANT TO AOP | 1 0 0 $A_1 A_2 A_3$ C C C C C 0 C 0 C C | LCN | N/A |
| AOP ANDED WITH CONSTANT | 1 0 0 $A_1 A_2 A_3$ C C C C C 0 C 1 C C | ACN | N/A |
| AOP ORED WITH CONSTANT | 1 0 0 $A_1 A_2 A_3$ C C C C C 1 C 0 C C | OCN | N/A |

$A_1 A_2 A_3$ = AOP REG. SELECT
C = VALUE OF CONSTANT

Table F

| | Memory Commands | | |
|---|---|---|---|
| OPERATION | BINARY VALUE | MNEMONIC | HEX Code |
| MEMORY WRITE | 1 0 1 $A_1 A_2 A_3$ 1 0 0 0 0 0 0 0 0 $A_0$ | MWT | N/A |
| INCREMENT SP ADDRESS | 1 0 1 0 0 0 0 1 0 0 0 0 0 0 0 0 | IMA | A100 |
| DECREMENT SP ADDRESS | 1 0 1 0 0 0 0 0 0 0 0 0 1 0 0 0 | DMA | A008 |
| MEMORY WRITE & INC | 1 0 1 $A_1 A_2 A_3$ 1 1 0 0 0 0 0 0 0 $A_2$ | WIA | N/A |
| MEMORY WRITE & DEC | 1 0 1 $A_1 A_2 A_3$ 1 0 0 0 0 0 0 1 0 0 $A_0$ | WDA | N/A |
| SET SP TEST MODE | 1 0 1 0 0 0 0 0 1 0 0 0 0 0 0 0 | SPT | A080 |
| RFU | 1 0 1 0 0 0 0 0 0 1 0 0 0 0 0 0 | — | A040 |
| LOAD REQUESTING CHANNEL | 1 0 1 0 0 0 0 0 0 0 1 0 0 0 0 0 | LRC | A020 |
| LOAD INDEX REG. WITH AOP | 1 0 1 $A_1 A_2 A_3$ 0 0 0 0 1 1 0 0 0 $A_0$ | LIR | N/A |
| SET MODULE BAD PARITY | 1 0 1 0 0 0 0 0 0 0 1 0 0 1 0 0 MBP | A004 | |
| RFU | 1 0 1 0 0 0 0 0 0 0 0 0 0 0 1 0 | — | A002 |

$A_0 A_1 A_2 A_3$ = AOP REG. SELECT.

Table G

| | Test Commands | | |
|---|---|---|---|
| OPERATION | BINARY VALUE | MNEMONIC | HEX CODE |
| TEST FOR ZERO | 1 1 0 $A_1$ $A_2 A_3$ 0 0 0 1 T T T T T $A_0$ | TFZ | N/A |
| TEST FOR ONE | 1 1 0 $A_1$ $A_2 A_3$ 0 0 1 0 T T T T T $A_0$ | TFO | N/A |
| RETURN | 1 1 0 0 0 0 1 0 0 0 0 0 0 0 0 0 | RTN | C200 |

$A_0 A_1 A_2 A_3$ = AOP REG. SELECT
TTTTT = TEST MUX INPUT.

Table H

| | Test Parameters | | |
|---|---|---|---|
| MNEMONIC | FUNCTION | HEX CODE | DESCRIPTION |
| TAHR | HDTSRO+00 | 00 | ADAPTER HARDWARE REQUEST |
| TBCA | SHRCOM+00 | 01 | BUS CYCLE ACTIVE |
| TRSP | BSRSVP+30 | 02 | BUS RESPONSE REQUIRED |
| TEQZ | ALUEQF+00 | 03 | ALU OUTPUT EQUALS 00 |
| TEQF | ALUEQF+00 | 04 | ALU OUTPUT EQUALS FF |
| TCOT | ALUCOT+00 | 05 | ALU CARRY OUT |
| TREQ | CREREQ+00 | 06 | CHANNEL REQUEST |
| TACK | ACKRSF+00 | 07 | BUS ACK RESPONSE |
| TAX0 | ALUAX0−00 | 08 | AOP MULTIPLEXER, BIT 0 |
| TAX1 | ↓ 1 | 09 | ↓ BIT 1 |
| TAX2 | ↓ 2 | 0A | ↓ BIT 2 |
| TAX3 | ↓ 3 | 0B | ↓ BIT 3 |
| TAX4 | ↓ 4 | 0C | ↓ BIT 4 |
| TAX5 | ↓ 5 | 0D | ↓ BIT 5 |
| TAX6 | ↓ 6 | 0E | ↓ BIT 6 |
| TAX7 | ALUAX7−00 | 0F | AOP MULTIPLEXER, BIT 7 |
| TORZ | DRCAR3−00 | 10 | OFFSET RANGE ZERO |
| TRGZ | EOR(xxx)+00 | 11 | RANGE ZERO |
| TSBS | SBSOBS+00 | 12 | SINGLE BYTE STORED |
| TSAW | SPAWRP+00 | 13 | SP ADDRESS WRAPAROUND |
| TADB | BUSY(xx)+00 | 14 | ADAPTER BUSY |
| TNDR | NDTSRQ+00 | 15 | NON-DATA SERVICE REQUEST |
| TORH | OFRNGZ=00 | 16 | OFFSET RANGE HISTORY |
| TDCN | MYDCNN−00 | 17 | MY DATA CYCLE NOW |
| TBSY | BDRBSY+00 | 18 | BUS DATA REGISTER BUSY |
| TUBR | UBRO(xx)+00 | 19 | UNSOLICITED BUS REQUEST |
| TINT | RESINT+00 | 1A | RESUME INTERRUPT |

Table H-continued

| | | Test Parameters | |
|---|---|---|---|
| MNEMONIC | FUNCTION | HEX CODE | DESCRIPTION |
| TNAK | NAKRSP+00 | 1B | NAK RESPONSE |
| TBYT | BSAD23+00 | 1C | BYTE MODE |
| TATY | BSPYCK+00 | 1D | BUS PARITY CHECK |
| TNBR | NOHTRQ+00 | 1E | NO BUFFER REQUEST |
| TFDR | FDTSRQ+00 | 1F | FIRMWARE DATA SERVICE REQUEST |

Table I

| | Branch Commands | | |
|---|---|---|---|
| OPERATION | BINARY VALUE | MNEMONIC | HEX CODE |
| GO TO | 1111AAAAAAAAAAAA | GTO | FXXX |
| LOAD RETURN | 1110AAAAAAAAAAAA | LRA | EXXA |

A = BRANCH ADDRESS.

Table J

| | | | | AOP Multiplexer Input Selection | | | |
|---|---|---|---|---|---|---|---|
| | | | | SELECTED REGISTER | | SELECTED REGISTER | |
| A₀ | A₁ | A₂ | 3 | (SRIA)* | MNEMONIC | (SRIA)* | MNEMONIC |
| 0 | 0 | 0 | 0 | ACCUMULATOR | AACU | ACCUMULATOR | AACU |
| 0 | 0 | 0 | 1 | SCRATCH PAD MEMORY | ASPM | SCRATCH PAD MEMORY | ASPM |
| 0 | 0 | 1 | 0 | SCRATCH PAD ADDRESS | ASPA | SCRATCH PAD ADDRESS (INDEXED) | ASPA |
| 0 | 0 | 1 | 1 | INDEX REGISTER | AIDX | SCRATCH PAD ADDRESS (INDEXED) | ASPA1 |
| 0 | 1 | 0 | 0 | ADAPTER DATA REGISTER | AAD0 | ADAPTER DATA REGISTER | AAD0 |
| 0 | 1 | 0 | 1 | ADAPTER DEVICE ID | AAD1 | ADAPTER DATA COUNTER | AAD1 |
| 0 | 1 | 1 | 0 | ADAPTER STATUS 1 | AAD2 | ADAPTER COMMAND REGISTER | AAD2 |
| 0 | 1 | 1 | 1 | ADAPTER STATUS 2 | AAD3 | ADAPTER UNIT SELECT | AAD3 |
| 1 | 0 | 0 | 0 | BUS ADDRESS OUT | ABUS1 | BUS REGISTER IN | ABUS1 |
| 1 | 0 | 0 | 1 | BUS DATA OUT 1 | ABUS2 | BUS DATA IN 1 | ABUS2 |
| 1 | 0 | 1 | 0 | BUS DATA OUT 2 | ABUS3 | BUS DATA IN 2 | ABUS3 |
| 1 | 0 | 1 | 1 | BUS RANGE OUT | ABUS4 | BUS ADDRESS IN | ABUS4 |
| 1 | 1 | 0 | 0 | ADAPTER RFU | AAD4 | RESET ADAPTER INDEX COUNT | AAD4 |
| 1 | 1 | 0 | 1 | ADAPTER RFU | AAD5 | ADAPTER STATUS & FIFO CLEAR | AAD5 |
| 1 | 1 | 1 | 0 | ADAPTER RFU | AAD6 | ADAPTER SEEK PULSE | AAD6 |
| 1 | 1 | 1 | 1 | ADAPTER RFU | AAD7 | ADAPTER DATA BYTE TAKEN | AAD7 |

*SRIA AND SRIA = STORE RESULT IN SELECTED AOP REGISTER.

Table K

| | | BOP MUX Input | |
|---|---|---|---|
| B₀ | B₁ | SELECTED DATA INPUT | MNEMONIC |
| 0 | 0 | ACCUMULATOR | BACU |
| 0 | 1 | SCRATCH PAD MEMORY | BSPM |
| 1 | 0 | BUS STATUS 0-3 (ZEROS) 4 BUS YELLOW IND. 5 BUS NAK 6 BUS PARITY ERROR 7 BUS RED IND. | BBST |
| 1 | 1 | BOP CONSTANT | |

The instructions of Tables C-G and I include A-fields comprised of bits A₀-A₃. Each of the A-fields refer to registers providing data to the AMUX 72 of FIG. 4. Table D further includes instructions having a B-field comprised of bits B₀ and B₁. The B-field is defined by Table K, wherein it is indicated that the BMUX may be selected to the accumulator 75, the scratchpad memory unit 81, to the bus logic unit 128 by way of cable 88 for bus status inputs, and to the firmware control system by way of cable 86 for a constant value input. Where two-byte arithmetic is being performed by the arithmetic unit 85, the C-field of Table D is used to provide a carry-in feature wherein the result of a previous AU 85 operation may be used in a subsequent operation. The F-field of the instructions of Table D provides a command to store the result of the AU 85 operation into a register designated by the A-field. The remaining low-order bits of Table D refer to the mode select bits for commanding the AU 85 to perform the indicated operation.

The instruction set of Table E includes a C-field for constant values, and the low-order bits of the instructions of Table F provide for the generation of strobes for loading the registers indicated by the A-field thereof. The instruction set of Table G includes test or T-fields which are defined by the entries of Table H. The A-field of Table I refers to the address of the microprogram to which a transfer is to be made.

Table L provides a cross-reference between the mnemonics used in the Tables A-K and the component parts of the system as described in FIGS. 4-8.

TABLE L

| Microinstruction Mnemonic | Hardware Device |
|---|---|
| RFU | Reserved For User |
| Bus Logic | Bus logic unit 128 |
| ALU | Arithmetic Unit 85, Arithmetic Control Unit 91, Accumulator 75 |
| Accumulator | Accumulator 75 |
| Scratchpad Memory | Scratchpad Memory Unit 81 |
| Scratchpad Address | Scratchpad Address Counter 79 |
| BLT | Bus Logic Tests |
| Address Counter | Bus Address Counters 300, 302 and 303 |
| Range Counter | Range Counters 306-309 |
| AOP | AMUX 72 |
| BOP | BMUX 84 |
| SP Address | Scratchpad Address Counter |

| TABLE L-continued | |
|---|---|
| Microinstruction Mnemonic | Hardware Device |
| Memory | Scratchpad Memory unit 81 |

FIG. 7

Figure 7A:
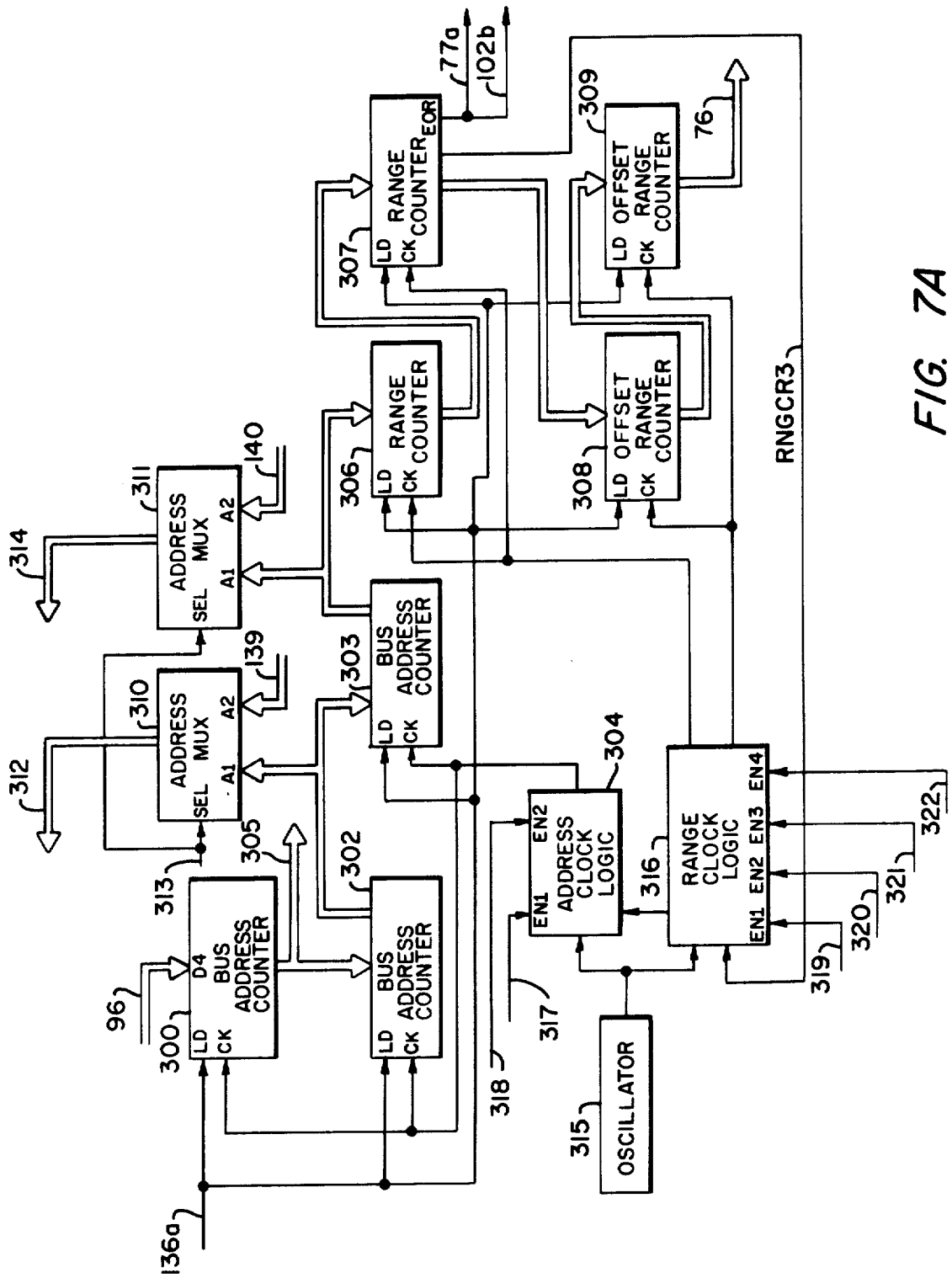
FIGS. 7A and 7B are detailed functional block diagrams of the range and offset range control unit of FIGS. 4 and 5.
Figure 7B:
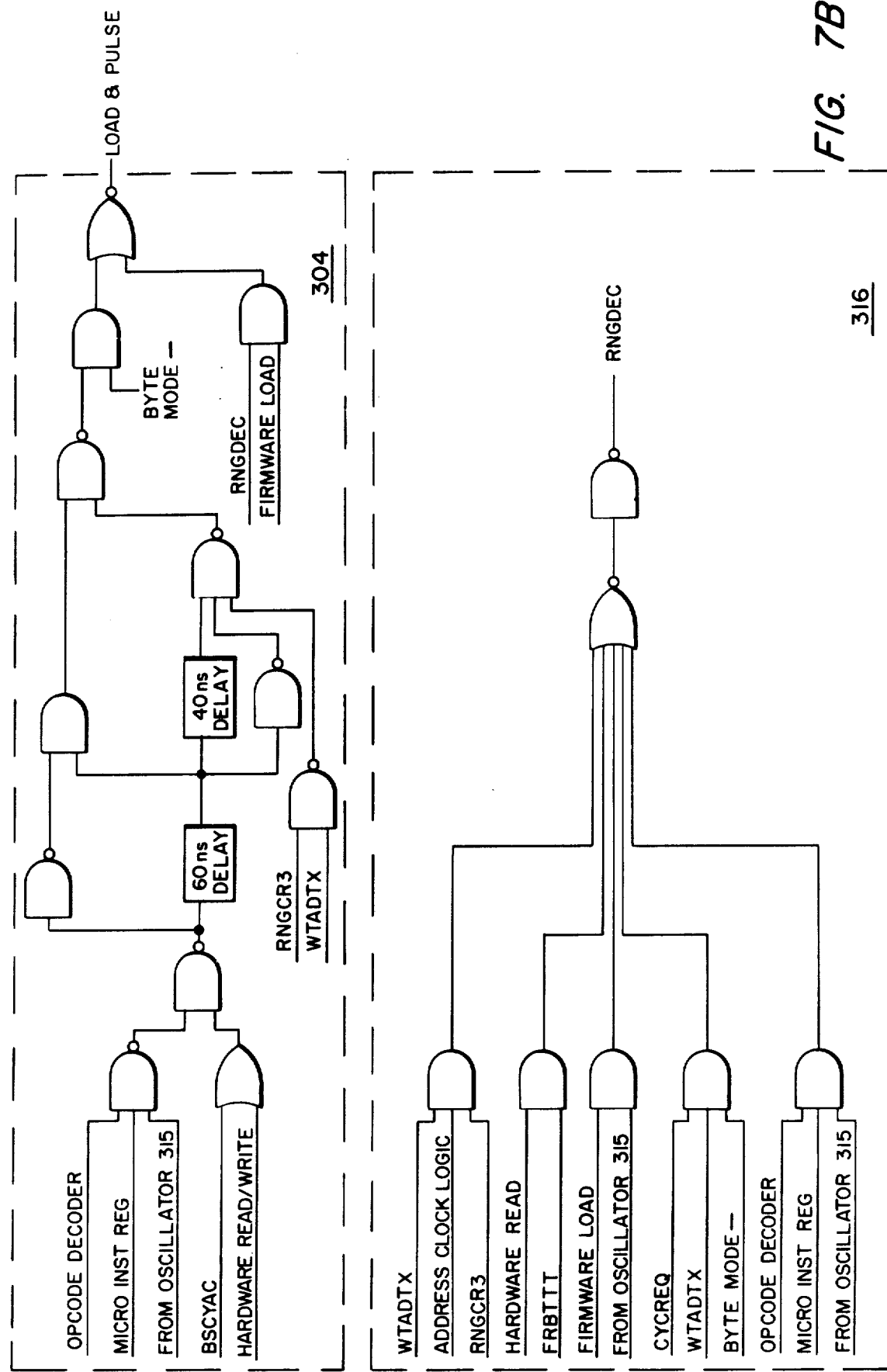

FIG. 7 illustrates in a more detailed functional block diagram form the range and offset range control unit 77, the address multiplexer 133 and the bus address register 136.

A bus address counter 300 receives data from AU 85 on an 8-bit data cable 96, and load commands from firmware on control line 136a. The clock input to counter 300 is connected to the clock input of a bus address counter 302, to the clock input of a bus address counter 303, and to the output of an address clock logic unit 304. The 8-bit output of the counter 300 is applied to the megabus 13 by way of a data cable 305, and to the data input of counter 302.

In the preferred embodiment described herein, address counters 300, 302 and 303 form a 24-bit memory address up counter.

The load input of counter 302 is connected to control line 136a and to the load inputs of counter 303, a range counter 306, a range counter 307, an offset range counter 308, and an offset range counter 309. The counters 306 and 307 form a 16-bit range down counter, and the counters 308 and 309 form a 16-bit offset range down counter. The 8-bit output of counter 302 is applied to the A1 input of an address multiplexer 310, and to the data input of counter 303. The 8-bit output of counter 303 is applied to the A1 input of an address multiplexer 311, and to the data input of range counter 306.

Address multiplexer 310 also receives at its A2 input data from data register 82 of FIG. 4 by way of cable 139. The 8-bit output of the multiplexer is applied to a data cable 312 leading to megabus 13. The select (SEL) input to multiplexer 310 is supplied by the bus logic unit 128 on a control line 313.

The address multiplexer 311 also receives data from the data register 82 by way of data cable 140, and supplies 8 bits of data to a data cable 314 leading to megabus 13. The SEL input to multiplexer 311 is connected to the SEL input of multiplexer 310.

The 8-bit output of range counter 306 is connected to the input of range counter 307. The output of counter 307 in turn is applied to the input of counter 308, and the 8-bit output of counter 308 is applied to the input of counter 309. The 8-bit output of counter 309 in turn is applied to control line 76 leading to the A3 input of AMUX 72.

The clock source for the system of FIG. 7 is a 4.0 MHz oscillator 315, which supplies clock signals to address clock logic unit 304 and a range clock logic unit 316. The logic unit 304 receives enable signals from bus logic unit 128 and from firmware on control lines 317 and 318, respectively. In response thereto, the logic unit 304 issues increment commands to counters 300, 302 and 303.

The range clock logic unit 316 receives enable signals from bus logic unit 128, the firmware and the data control unit 113 by way of control lines 319-321, respectively. Further, the control unit 113 supplies an offset range enable signal to the EN4 input of logic unit 316.

When enabled, the logic unit 316 supplies decrement commands to counters 306-307 or counters 308-309.

If data is to be read from or written onto a disk device controlled by the device adapter 14, the CPU 11 of FIG. 1 supplies a channel destination number and a function code to the address shift register 70 of FIG. 4 as before described. In addition, the CPU supplies configuration words A and B, a main memory address, a range count, an offset range count, a task and a status request to the data register 82. The firmware accesses the function code in register 70 to detect the address in scratchpad memory unit 81 in which the data of register 82 is to be stored.

The firmware then serially shifts seven bytes of data a byte at a time from scratchpad memory unit 81 into address counters 300, 302 and 303, range counters 306 and 307, and offset range counters 308 and 309. Upon completion of the load operation, a main memory address resides in address counters 300, 302 and 303, a range count in counters 306-307, and an offset range count in counters 308-309.

In a read operation wherein data is to be read from the disk device and written into main memory unit 12, the megabus 13 is supplied both data and a 24-bit address in main memory in which the data is to be written. More particularly, the data resides in the bus data register 100. When a data word comprising two data bytes is to be transferred from the MPDC 10 to the megabus 13, the bus logic unit 128 selects the multiplexers 310 and 311 to the A1 inputs. The main memory module to which the data is to be transferred thereby is made available to the megabus 13. The main memory address in which the transferred data is to be written thereupon is supplied from address counters 300, 302 and 303 to cables 305, 312 and 314 respectively. Each time the main memory unit issues an acknowledgement signal and accepts data into the indicated address, the main memory address in counters 300, 302 and 303 is incremented by two.

During a data transfer from device adapter 14 to MPDC 10, the data control unit 113 of FIG. 5 issues a logic one signal to control line 322 each time a data byte is transferred. The range clock logic unit 316 is enabled thereby to decrement the offset range counters 308 and 309. The output of counter 309 is applied by way of cable 76 to the AMUX 72 and the AU 85 of FIG. 4. As long as the offset range count is greater than zero, the data bytes are ignored and are not transferred to megabus 13. When the offset range count is exhausted, however, data transfer control switches from the offset range counters to the range counters 306 and 307. More particularly, the data control unit 113 disables the EN4 input to logic unit 316, and thereafter issues enable signals to the EN3 input of the logic unit by way of control line 321. The logic unit 316 in response thereto decrements the range counters each time a data byte is transferred from the device adapter 14 to the MPDC 10. Each of the data bytes transferred after control switches to the range counters are transferred to megabus 13.

When the range count in counters 306 and 307 is exhausted, counter 307 issues an end-of-range (EOR) signal on lines 77a and 102b as before described.

A write operation wherein data is read from main memory and written onto a disk device is accomplished in a manner similar to that of the read operation. A channel destination number and a function code are loaded into the address shift register 70, and data including configuration words A and B, a main memory address, a range count, a task and a status request are loaded from data register 82 into scatchpad memory unit 81. An offset range count is not used in writing data onto a disk device.

After the device adapter 14 has positioned the write heads of the disk device, and issued a hardware service request signal on line 110 of FIG. 4, firmware loads two dummy bytes into the offset range counters 308 and 309, a range count into counters 306 and 307, and a main memory address into counters 300, 302 and 303. The firmware further transfers an MPDC channel number from scratchpad memory unit 81 to the bus data register 100, and thence through data multiplexer 122 to megabus 13. Under firmware control, the bus logic unit 128 issues a response-required data request to main memory, and selects the multiplexers 310 and 311 to their A2 inputs to supply the main memory channel number in address shift register 70 to megabus 13. The bus logic unit thereafter selects the multiplexers 310 and 311 to their A1 inputs to supply the main memory address to megabus 13.

Each time the bus logic unit 128 requests an additional data byte from main memory, the logic unit also issues a logic one signal to control line 319 to enable the range clock logic unit. The range counters 306 and 307 thereupon are decremented by one. Further, after a data request and a main memory address have been issued to megabus 13 and accepted by the main memory unit 12, the bus logic unit 128 enables the EN1 input of the address clock logic unit 304. In response thereto, the address counters 300, 302 and 303 are incremented by two.

When the range count has been exhausted, counter 307 issues an EOR signal to lines 77a and 102b as before described. The data transfer from main memory unit 12 to disk device 14 thereby is designated complete.

The system of FIG. 7 represents a significant improvement over prior firmware data transfer controls, which required too much time for bookkeeping. Previously, bookkeeping parameters were stored in memory, and had to be retrieved and restored when a parameter was updated. In the instant hardware/firmware invention, the bus address counters 300, 302 and 303, the range counters 306–307, and the offset range counters 308–309 may be loaded serially to substantially decrease the number of microinstructions required in a load operation. Further, during a data transfer, the counters may be incremented or decremented under hardware control to accommodate an increased data flow rate.

FIG. 8

Figure 8:
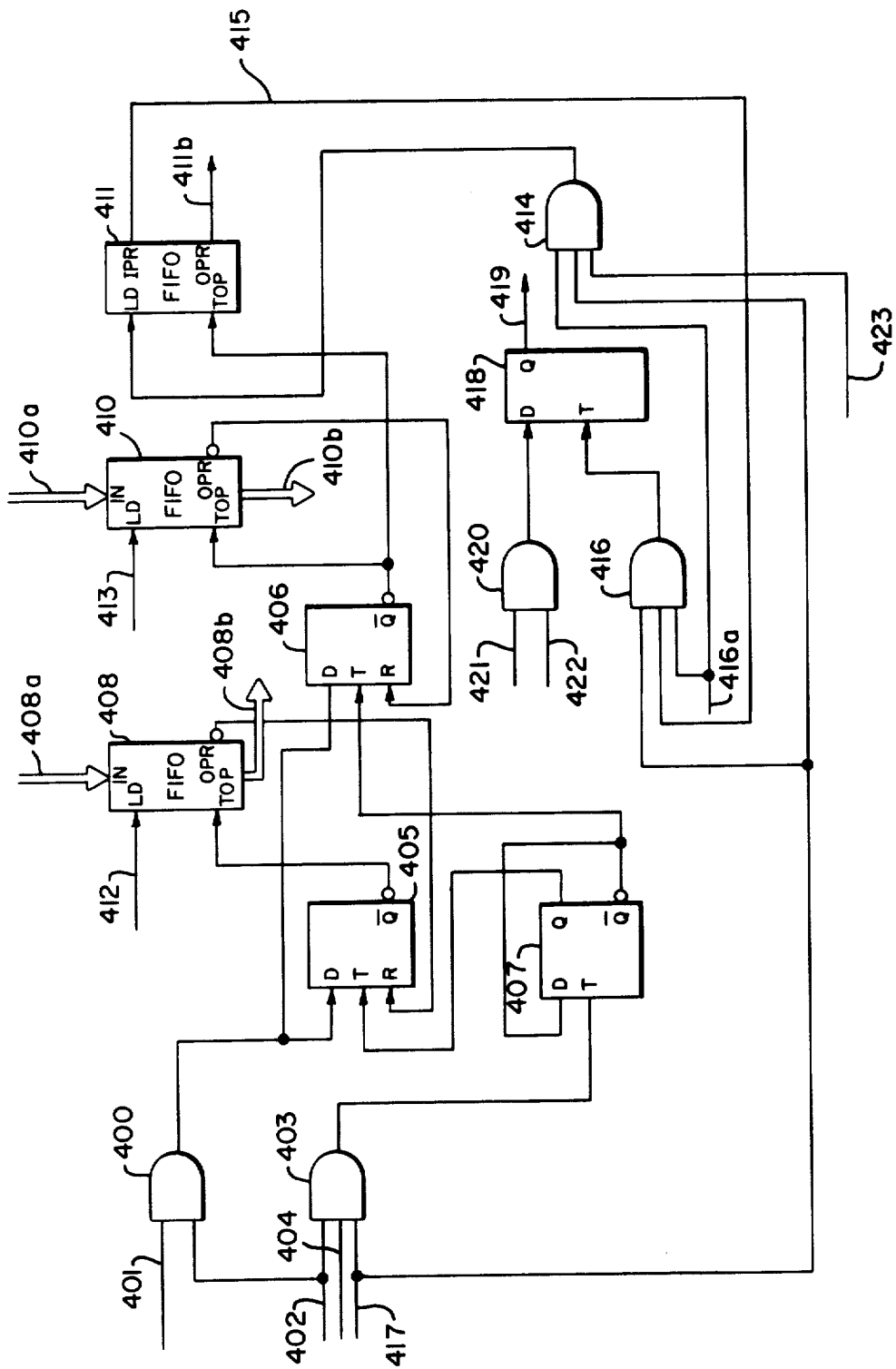
FIG. 8 is a detailed logic diagram of the data FIFO unit of FIG. 4.

FIG. 8 illustrates in detailed logic diagram form the FIFO unit 131 of FIG. 5.

In referring to the electrical schematics illustrated in the Figures, it is to be understood that the occurrence of a small circle at the input of a logic device indicates that the input is enabled by a logic zero. Further, a circle appearing at an output of a logic device indicates that when the logic conditions for that particular device are satisfied, the output will be a logic zero.

An AND gate 400 has one input connected to a control line 401, and a second input connected to both a control line 402 and one input of an AND gate 403. A second input to gate 403 is connected to a control line 404 leading to line 110 of FIG. 4, and a third input is connected to a control line 405.

The output of gate 400 is connected to the D input of a flip-flop 405, and to the D input of a flip-flop 406. The output of gate 403 is applied to the trigger (T) input of a flip-flop 407.

The trigger input to flip-flop 405 is connected to the Q output of flip-flop 407, and the reset input of flip-flop 405 is connected to the output register (OPR) output of a 16-word by eight bit FIFO 408. When the OPR output is at a logic 1 level, the output register is filled. Further, when the OPR output is at a logic zero level, the output register is empty. The $\bar{Q}$ of flip-flop 405 is applied to the transfer on parallel (TOP) input of FIFO 408.

The $\bar{Q}$ output of the flip-flop 407 is connected to its D input, and to the T input of flip-flop 406. The reset input to flip-flop 406 is connected to the OPR output of a 16-word by 8 bit FIFO 410. The $\bar{Q}$ output of the flip-flop 406 is connected to the TOP input of FIFO 410, and to the TOP input of a 16-word by 8 bit FIFO 411.

The load (LD) input to FIFO 408 is connected to a control line 412, and the data input to the FIFO is connected to a data cable 408a leading from data register 82 of FIG. 4. The parallel data output of FIFO 408 is connected to a data cable 408b leading to cable 94. The LD input to FIFO 410 is connected to a control line 413, and the data input to the FIFO is connected to a data cable 410a leading from data register 82. The parallel output of the FIFO is applied through a data cable 410b to cable 94.

The LD input to FIFO 411 is connected to the output of an AND gate 414. The input register (IPR) output of the FIFO 411 is connected by way of a control line 415 to one input of an AND gate 416. The IPR output is at a logic one level when the input register is empty, and at a logic zero level when the input register is filled. The OPR output of FIFO 411 is applied by way of a control line 411b to line 102b of FIG. 5.

A second input to gate 416 is connected to a third input to gate 403, and to a control line 417. A third input to gate 416 is connected to one input of gate 414, and to a control line 416a. The output of gate 416 is applied to the T input of a flip-flop 418, the Q output of which is applied to a control line 419 leading to the bus logic unit 128.

The D input to flip-flop 418 is connected to the output of an AND gate 420, one input of which is connected to a control line 421. A second input to gate 420 is connected to a control line 422.

A second input to gate 414 is connected to control line 417, and a third input to gate 414 is connected to a control line 423.

In a write operation wherein data is read from the main memory 12 of FIG. 1 and written into a disk device serviced by the device adapter 14, a problem may arise during the transfer of a sequence of data bytes. If a request for additional data is not issued by the MPDC 10 when a data byte is received from the main memory unit 12, other system devices may intercede to communicate with the memory unit. The MPDC thus would not be able to maintain a transfer rate to the disk device. If a request for data is made without regard for empty buffer locations, data stored in the data register 82 of FIG. 4 may be lost before the full range of data to be transferred from main memory has been written upon the disk device. The logic system of FIG. 8 provides a means for obviating such a problem.

In operation, when data is to be transferred from the main memory unit 12 to the MPDC 10, firmware issues a logic 1 signal to control line 417. If the megabus 13 is clear for a data transfer, the bus logic unit 128 of FIG.

5 issues a logic 1 signal to control line 422 to indicate that the megabus 13 is ready. Further, until the data transfer is completed, the control line 421 leading from the range and offset range control unit 77 remains at a logic 1 level to indicate that the range count has not been exhausted. The output of gate 420, therefore, is at a logic 1 level which is applied to the D input of the flip-flop 418.

Prior to any data being transferred to the MPDC 10, the FIFO's 408, 410 and 411 are empty. The IPR output of FIFO 411 thus is at a logic 1 level indicating that the input register is empty. Further, the bus logic unit 128 supplies a logic 1 signal to control line 416a during a time period when the MPDC 10 is not using the megabus 13 in servicing a bus cycle request. Thus, the output of the gate 416 is at a logic 1 level to toggle the flip-flop 418, thereby issuing a bus cycle request on line 419 leading to the bus logic unit 128.

In generating a bus cycle request for output on the megabus 13, the bus logic unit 128 issues a logic 1 signal to control line 423 to indicate that an MPDC 10 bus cycle request has been issued. The firmware control signal on control line 417 thereupon is applied through gate 414 to the load input of FIFO 411. A dummy byte thereby is loaded into the FIFO under firmware control, and the IPR output of the FIFO transitions to a logic zero level. It is thus seen that each time a cycle request is generated at the Q output of flip-flop 418 to request additional data from main memory unit 12, a dummy byte is loaded into the FIFO 411.

When the main memory unit responds to the bus cycle request, the bus logic unit 128 issues a logic zero signal to control line 423 and a logic 1 signal to control lines 412 and 413. Data bytes supplied by the main memory unit 12 to the megabus 13 thereby are loaded from data cables 408a and 410a into FIFO 408 and FIFO 410, respectively. The bus logic unit 128 thereupon transitions the control line 416a to a logic 1 level to indicate that the bus cycle request for data has become inactive. If the dummy data byte loaded into the FIFO 411 has dropped from the input register into the FIFO stack, the IPR output of the FIFO will transition to a logic 1 level to again trigger the flip-flop 418 to issue another cycle request on control line 419.

The above-described process continues until the FIFOs 408 and 410 are filled as indicated by the output register (OPR) outputs of the FIFOs. The FIFO 411 thus serves to indicate in advance that if a data word is loaded into the data FIFOs 408 and 410, the data word will pass into the FIFO stack before another data word can be requested of main memory unit 12. More particularly, each time a data request is made to main memory unit 12 a dummy byte is loaded into the FIFO 411. If the dummy byte has passed into the FIFO stack before a next data request is made to main memory, then the time delays are such that it is known that the data bytes in the FIFOs 408 and 410 shall pass into the respective FIFO stacks before additional data bytes are received from main memory.

When the FIFO units 408 and 410 are filled with data, the OPR outputs of the FIFO units are at a logic zero level indicating a filled condition. Further, the IPR output of FIFO 411 is at a logic zero level. The gate 416 thus is disabled, and the generation of cycle requests on control line 419 is terminated.

When the OPR output of FIFO 411 transitions to a logic 1 level to indicate that the data FIFOs 408 and 410 are filled, the hardware control unit 108 issues a strobe to the adapter logic unit 29. The logic unit 29 in turn issues a strobe to the device adapter 14 to indicate that the data FIFOs may be emptied. The device adapter 14 thereupon issues a logic 1 hardware service request signal to control line 404, and the firmware in response thereto issues a hardware enable signal to control line 402. The firmware further issues a logic 1 signal to control line 401 to indicate that a write on disk operation has been initiated.

The flip-flop 407 is triggered by the output of gate 403, and toggles between set and reset conditions. For example, if the flip-flop is in a set condition, it resets upon being triggered. Further, if the flip-flop is in a reset condition, it sets upon being triggered. The Q and $\overline{Q}$ outputs of the flip-flop thereby alternately trigger the flip-flops 405 and 406 respectively. If the flip-flop 405 is triggered, the $\overline{Q}$ output of the flip-flop is applied to the TOP input of the FIFO 408. In response thereto, the data byte in the output register of the FIFO is supplied to data cable 408b leading to the device adapter 14. When the output register is emptied, the OPR output of the FIFO 408 immediately resets the flip-flop 405. In like manner, when the flip-flop 406 is triggered, the $\overline{Q}$ output of the flip-flop supplies an unload signal to the FIFO 410. When the output register of the FIFO is emptied, the OPR output of the FIFO resets the flip-flop 406. It is apparent that the flip-flop 407 in combination with the flip-flops 405 and 406 alternately selects data bytes from FIFO 408 and FIFO 410. The data bytes transmitted to the device adapter 14 thus are comprised of a left byte from FIFO 408 and a right byte from FIFO 410.

Each time the FIFO 410 is unloaded, the FIFO 411 also is unloaded. As soon as the input register to the FIFO 411 is emptied, the IPR output of the FIFO transitions to a logic 1 level to generate a cycle requests as before described. As data bytes are loaded into the FIFOs 408 and 410, the FIFOs again are unloaded. Before a cycle request for a next data byte is requested from main memory unit 12, however, the input register to the FIFO 411 must be emptied.

Two conditions may occur which may prevent the generation of a cycle request on control line 419 when the input register to FIFO 411 is empty. When the range count indicating the total number of data bytes to be transferred from main memory unit 12 to the device adapter 14 is exhausted, line 421 transitions to a logic zero. Further, if an unsolicited bus request or other data occurs on the megabus 13 to cause the MPDC 10 to issue a NAK, the gate 420 is disabled. The Q output of the flip-flop 418 thus does not transition to a logic 1 level when triggered, and no further cycle requests may be made.

FIG. 9

Figure 9:
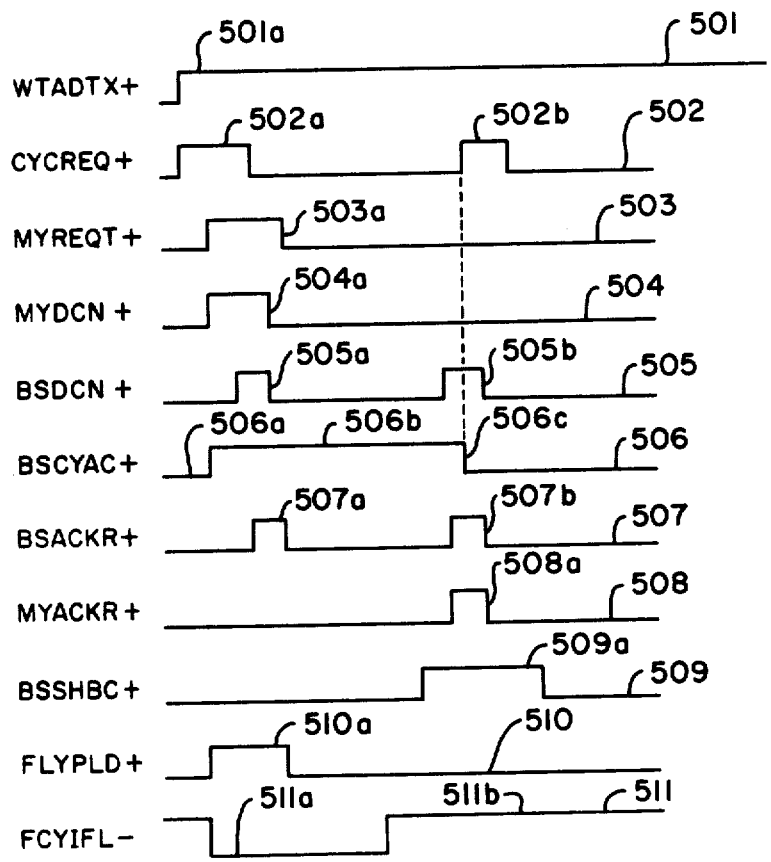
FIG. 9 is a timing diagram of the operation of the system of FIG. 8.

FIG. 9 is a timing diagram illustrating in graphic form the operation of the system of FIG. 8.

It is to be understood that the system disclosed herein is comprised of devices in intercommunication on an asynchronous bus. Thus, absolute time values are not disclosed in the description of the timing diagrams of FIGS. 9-11. It is the order of occurrence rather than the absolute time of occurrence which is of primary importance.

Referring to FIG. 9, a waveform 501 illustrates a signal issued by firmware to place the MPDC 10 into a write mode, and a waveform 502 illustrates a cycle request signal issued by the bus logic unit 128 of FIG. 5 in response to firmware commands. A waveform 503 illustrates a bus cycle request made by the MPDC 10 to the megabus 13, and a waveform 504 illustrates a strobe issued by the bus logic unit 128 to set the cycle request logic signals of waveform 502 onto the megabus 13 as indicated by waveform 503. A waveform 505 illustrates a logic signal formed on the megabus 13 in response to the logic signals of waveforms 503 and 504. A waveform 506 illustrates a waveform generated in the MPDC 10 to indicate that the MPDC is busy. A waveform 507 illustrates a logic signal issued by a slave to the megabus 13 in response to a bus request issued by a master device. A waveform 508 illustrates an acknowledgement logic signal issued by the MPDC 10 to the megabus 13 in response to a second-half bus cycle signal from the main memory unit 12 as illustrated by a waveform 509. A waveform 510 illustrates the load signal issued by the gate 414 to the FIFO 411 of FIG. 8, and a waveform 511 illustrates the logical inverse of the input register output of the FIFO 411. A waveform 512 illustrates the logic signal issued by the output register of the FIFO 411 when the data FIFOs 408 and 410 are filled.

In the mnemonics used to describe the waveforms 501-512 in FIG. 9, a plus sign (+) indicates that the condition signified by the mnemonic occurs when the associated waveform is at a logic 1 level. A negative sign (−) indicates that the designated condition occurs when the waveform is at a logic zero level.

Figure 11:
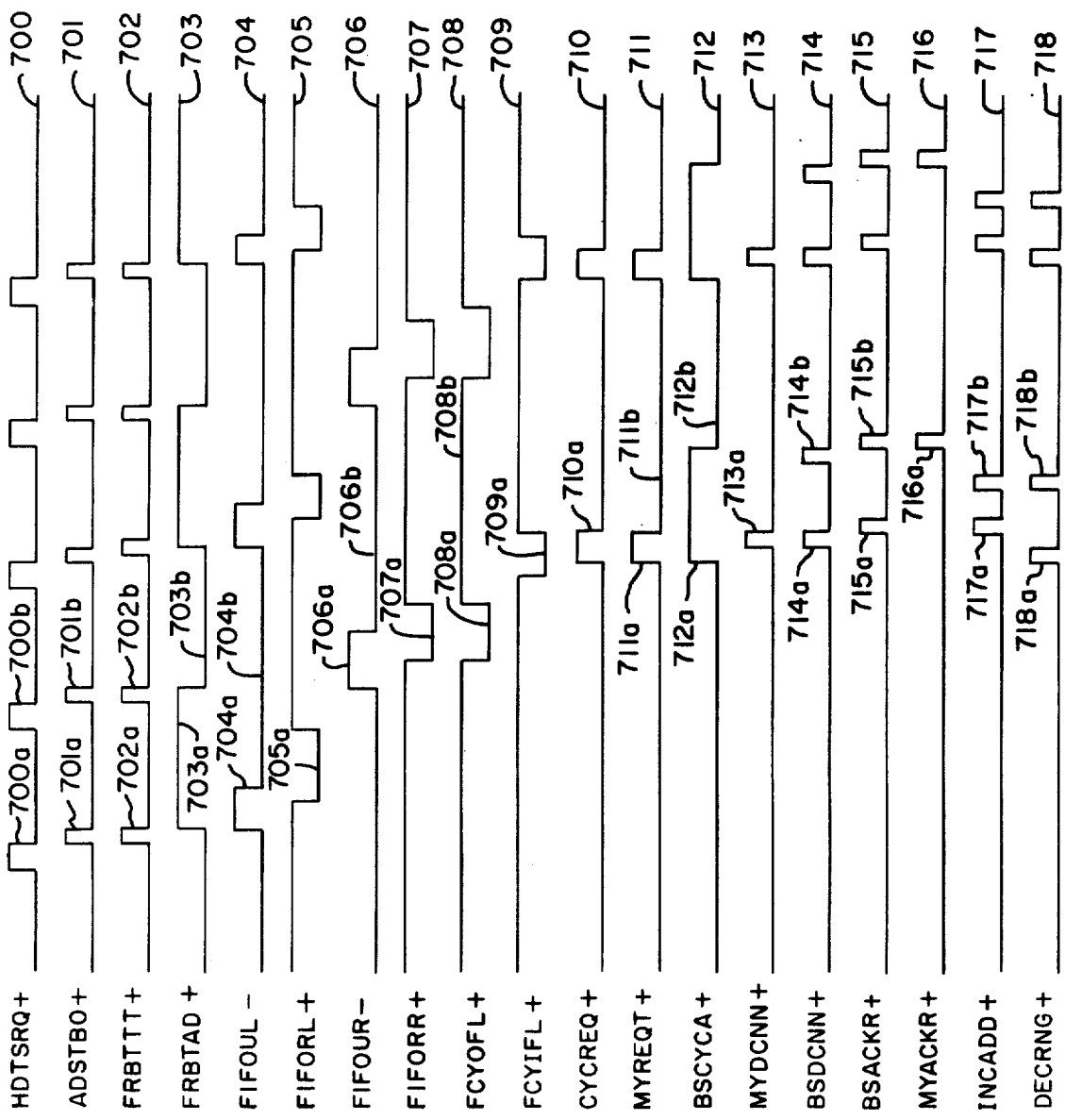
FIG. 11 is a timing diagram of the operation of the system of FIGS. 4–8 during a data transfer from the main memory unit to the disk adapter of FIG. 1.

When data is to be written from main memory unit 12 of FIG. 1 to a disk device serviced by the device adapter 14, firmware transitions the control line 417 of FIG. 8 to a logic 1 level as indicated at 501a of waveform 501. Since the bus cycle is not active as indicated at 506a of waveform 506, the MPDC 10 is not engaged in servicing a previous bus cycle request. Thus the control line 416a is at a logic 1 level, and a logic 1 signal issued by the input register FIFO 411 as illustrated at 511a of FIG. 11 is applied through the gate 416 to trigger the flip-flop 418. The Q output of flip-flop 418 thereupon transitions to a logic one level as illustrated at 502a. The cycle request 502a thereby is placed onto the megabus 13 as control line 419. When a cycle of the megabus 13 is available, the bus logic unit 128 of FIG. 5 will issue a logic 1 pulse 504a to place the cycle request 502a onto the megabus 13 as illustrated by the logic 1 pulse 503a. The signal appearing on the megabus 13 in response to the pulses 503a and 504a is illustrated by a logic 1 pulse 505a of waveform 505.

The bus logic unit 128 issues a logic 1 pulse 506b concurrently with pulse 504a to indicate that the bus cycle is active, i.e., the MPDC 10 is busy. In response thereto, the output of gate 414 transitions to a logic 1 level as illustrated by a logic 1 pulse 510a to load a dummy byte into the FIFO 411. Upon receiving the bus cycle request from the MPDC 10, the main memory unit 12 acknowledges its acceptance of the request by issuing a logic 1 pulse 507a of waveform 507.

When the dummy byte is loaded into the FIFO 411, the waveform 511 transitions to a logic zero level as indicated at 511a. Since gate 416 will be disabled during the time period that waveform 511 remains at a logic zero level, no further bus cycle requests may be made until the waveform again transitions to a logic 1 level.

When the main memory unit 12 has retrieved a requested data word and placed it on the megabus 13, the memory unit issues a logic 1 pulse 509a to indicate that the data is available. Further, the memory unit issues a logic 1 pulse 505b. Upon receiving the pulses 505b and 509a, the bus logic unit 128 issues an acknowledgement logic 1 pulse 508a which appears on the megabus 13 as logic 1 pulse 507b. Upon receiving the pulse 507b, the main memory unit releases the megabus 13 to accommodate another bus cycle request. Upon issuing the pulse 508a, the MPDC 10 is no longer in a bus cycle active state as indicated at 506c. Since the output of the input register of the FIFO 411 is again empty as indicated at 511b, a logic 1 pulse 502b is supplied at the Q output of flip-flop 418 to initiate a next bus cycle request operation.

FIG. 10

Figure 10:
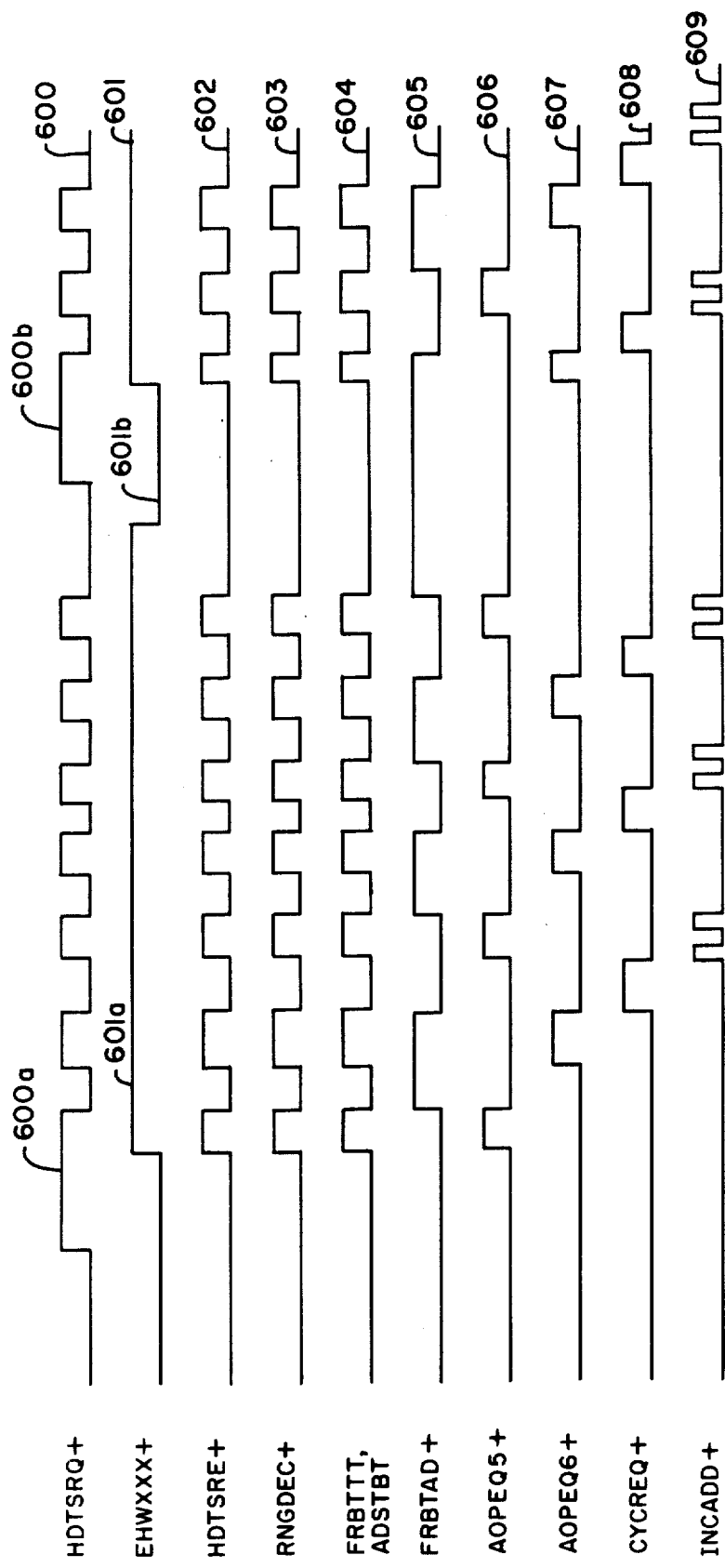
FIG. 10 is a timing diagram of the operation of the system of FIGS. 4–8 during a data transfer from a disk device to the common communication bus.

FIG. 10 is a timing diagram illustrating the operation of the system of FIGS. 4-8 during a data transfer from a disk device to megabus 13.

A waveform 600 illustrates the hardware data service request signal issued by the device adapter 14 to control line 110 of FIG. 4, and a waveform 601 illustrates the hardware enable signal issued by firmware in response to the waveform 600. A waveform 602 illustrates a hardware data service enable signal which is a logical AND of waveforms 600 and 601. Waveform 602 illustrates the enable signal applied by firmware to the EN2 enable input of range clock logic unit 316 of FIG. 7 during diagnostic tests.

A waveform 603 illustrates the output of range clock logic unit 316 in response to the enable signal illustrated by waveform 602. A waveform 604 illustrates the output of gate 403 of FIG. 8, and the output of the adapter logic unit 29 of FIG. 4. A waveform 605 illustrates the inverse to the Q̄ output of flip-flop 407 of FIG. 8.

Waveforms 606 and 607 each are formed from waveforms 604 and 605, and indicate the output states of the flip-flop 407. A waveform 608 illustrates the bus cycle request signals issued at the Q output of flip-flop 418 of FIG. 8, and a waveform 609 illustrates the pulse pairs generated by the address clock logic unit 304 each time a cycle request is made as illustrated by waveform 608.

When data is to be read from a disk device, the device adapter 14 of FIG. 4 issues a logic 1 pulse 600a to control line 110 to indicate that a data byte is available for transfer to the MPDC 10. In response thereto, the firmware control system of FIG. 6 issues an enable hardware pulse 601a to the control line 109 of FIG. 4 leading to the hardware control unit 108. As the data byte is transferred from the device adapter 14 to the MPDC 10, the timing signal illustrated by waveform 602 is applied to the range clock logic unit 316 of FIG. 7. In response thereto, the offset range counters 308 and 309 are decremented until the offset range count is exhausted. The range counters 306 and 307 thereafter are decremented as illustrated by the logic 1 pulses of waveform 603.

Each time data bytes are transferred from the device adapter 14 to the MPDC 10, the output of gate 403 as illustrated by the waveform 604 triggers the flip-flop 407. When the Q output of flip-flop 407 is at a logic 1 level, flip-flop 405 is triggered to load a left byte in bus data register 100 for transfer to the megabus 13. This condition is illustrated by the logic 1 levels of waveform 605 and waveform 607. When the Q̄ output of the flip-flop 407 transitions to a logic 1 level, the flip-flop 406 is triggered to load a right byte in register 100 for transfer to the megabus 13. This condition is illustrated by the logic zero levels of waveform 605 and the logic 1 levels of waveform 606.

When a data word comprising a left and a right data byte have been formed in the register 100, the bus logic unit 128 under firmware control issues a bus cycle active signal to control line 416a of FIG. 8 to trigger the flip-flop 418. A bus cycle request thereby is generated as illustrated by the logic 1 levels of waveform 608. Each time a busy cycle request is generated, the bus logic unit 128 enables the address clock logic unit 304 to issue logic 1 pulse pairs as illustrated by waveform 609. The main memory address stored in the bus address counters 300, 302 and 303 thereupon is incremented by two.

Should an interim condition arise wherein data is not available for transfer to the MPDC 10 before the range count has been exhausted, the device adapter issues an interrupt to line 125 of FIG. 4 to return control from the system hardware system to the firmware. In that event, the enable hardware signal of waveform 601 transitions to a logic zero level as indicated at 601b. No further MPDC activity occurs until the device adapter 14 indicates that data again is available for transfer by issuing a logic 1 pulse 600b to line 110 of FIG. 4. The data transfer thereafter continues as before described until the range counter is exhausted.

FIG. 11

FIG. 11 is a timing diagram illustrating the operation of the system of FIGS. 4–8 during a write operation.

A waveform 700 illustrates the hardware data service request signal issued by the device adapter 14 to the control line 110 of FIG. 4, and a waveform 701 illustrates a strobe signal issued by the adapter logic unit 29 to control lines 29a and 118b of FIG. 4. A waveform 702 illustrates the output of gate 403 of FIG. 8, and a waveform 703 illustrates the logic inverse of the $\overline{Q}$ output of the flip-flop 407. A waveform 704 illustrates the logic inverse of the $\overline{Q}$ of flip-flop 405, and a waveform 705 illustrates the output register (OPR) output of FIFO 408.

A waveform 706 illustrates the logic inverse of the $\overline{Q}$ output of flip-flop 406, and a waveform 707 illustrates the OPR output of flip-flop 410. A waveform 708 illustrates the OPR output of FIFO 411, and a waveform 709 illustrates the logic inverse of the IPR output of FIFO 411. A waveform 710 illustrates the Q output of flip-flop 418, and a waveform 711 illustrates a bus cycle request signal generated by the bus logic unit 128 in response to the waveform 710.

A waveform 712 illustrates a bus cycle active signal placing the MPDC 10 in a busy state in response to the bus cycle request pulses of waveform 711. A waveform 713 illustrates a data cycle signal issued by the bus logic unit 128 to indicate a time period in which the main memory unit 12 must acknowledge a data request from the MPDC 10. A waveform 714 illustrates the bus request and acknowledgement pulses occurring on the megabus 13 as a result of the handshaking between the MPDC and the main memory. A waveform 715 illustrates the bus acknowledgement pulses issued by a slave system device in response to a bus request from a master system device, and a waveform 716 illustrates MPDC acknowledgement pulses which are reflected in the pulses of waveform 715. A waveform 717 and a waveform 718 respectively illustrate address increment pulses and range decrement pulses generated during the transfer of data from main memory unit 12 to the device adapter 14.

Prior to the transfer of data from main memory, the device adapter 14 positions the write heads of a disk device at a designated record. After the disk device is prepared for a write operation, the adapter 14 issues a hardware service request signal as illustrated by pulse 700a to the control line 110. The bus logic unit 128 thereupon requests data from the main memory unit 12. The main memory unit 12 in response thereto, supplies data to the data register 82 of FIG. 4. Under control of the data control unit 113, the data is transferred from data register 82 into the data FIFOs 408 and 410. When the data FIFOs are filled, the hardware control unit 108 signals the adapter logic unit 29. The logic unit 29 in turn issues a strobe pulse 701a to the device adapter 14 to indicate that a data byte is being transferred. Concurrently, gate 403 of FIG. 8 issues a pulse 702a to select a data byte from one of the FIFOs 408 and 410 for transfer to the device adapter 14. In response to the gate 403 output, flip-flop 407 of FIG. 8 issues a pulse 703a to trigger the flip-flop 405. Flip-flop 405 in turn issues a pulse 704a to select a data byte from the FIFO 408.

When the data byte is taken from the output register of the FIFO 408, the OPR output of the FIFO transitions to a logic zero level as indicated at 705a. The OPR output further resets the FIFO 405 as indicated at 704b of waveform 704. When the data byte has been taken by the device adapter 14, the adapter issues a second hardware data service request pulse 700b. In response thereto, the adapter logic 29 pulse 701b and the gate 403 pulse 702b are generated as before described. Upon the occurrence of pulse 702b, the $\overline{Q}$ output of the flip-flop 407 triggers the flip-flop 406 as indicated at 703b of waveform 703. The $\overline{Q}$ output of flip-flop 406 thereupon issues a logic 1 pulse 706a to unload the output register of the FIFO 410. When the data byte is transferred out of the output register, the OPR output of the FIFO 410 transitions to a logic zero as indicated at 707a of waveform 707. In response to the logic transition of the OPR output, the flip-flop 406 is reset as indicated at 706b.

As before described, the FIFO 411 is unloaded at the same time the FIFO 410 is unloaded. Thus, when the OPR output of FIFO 410 transitions to a logic zero, the OPR output of FIFO 411 also transitions to a logic zero as indicated at 708a of waveform 708. When an additional dummy byte enters the output register of FIFO 411, the OPR output transitions to a logic 1 as indicated at 708b. In addition, the input register output IPR changes state as indicated at 709a. A bus cycle request on control line 419 thereby is initiated as indicated by logic one pulse 710a. In response to pulse 710a, the bus logic unit 128 of FIG. 5 issues a strobe pulse 713a to place the cycle request pulse 710a onto the megabus 13 as indicated by pulse 711a. Upon the occurrence of the strobe 713a and the pulse 711a, a pulse 714a is carried by the megabus 13 to the main memory unit 12.

When the cycle request pulse 710a is generated, the bus logic unit 128 places the MPDC 10 in a busy state as indicated by the logic 1 pulse 712a. During the time period of the pulse 712a, the MPDC 10 issues a data request to the main memory unit 12 as indicated by pulse 714a and awaits a response.

If the memory unit 12 accepts the bus cycle request and the main memory address supplied by MPDC 10, the main memory unit issues a pulse 715a. In response thereto, the bus logic unit 128 of FIG. 5 transitions the bus cycle request signal illustrated by waveform 711 to a logic zero level as indicated at 711b. During a time period not exceeding that indicated by the logic 1 pulse 712a, the main memory unit retrieves the contents at the indicated main memory address and supplies the data to the megabus 13. In addition, the main memory unit issues a pulse 714b to notify the MPDC 10 that data at the indicated main memory address is forthcoming. In response thereto, the bus logic unit 128 issues a strobe 716a to place an acknowledgement pulse 715b on the megabus 13. Concurrently therewith, the bus logic unit removes the MPDC 10 from the busy state as indicated by the logic zero level 712b of waveform 712.

The above-described process is repeated until the total number of data bytes indicated by the range count has been transferred from the main memory unit 12 to the device adapter 14.

During the data transfer process, the bus address counters 300, 302 and 303 are incremented and the range counters 306–309 are decremented. More particularly, the address counters are incremented twice as indicated by pulses 717a and 717b each time a data request is made to the main memory unit 12 as indicated by pulse 715a. Further, the range counters are decremented each time a data byte is requested by the MPDC 10 from the main memory unit 12. One decrement command as illustrated by pulse 718a is issued when a request 710a for a data word is issued. A second decrement command as illustrated by pulse 718b is issued by the main memory unit 12.

In accordance with the invention, a data transfer accounting system is provided which is responsive to both hardware and firmware control. More particularly, address counters and range counters are connected in a manner to form a serial data path. Firmware thereby may load the counters with address and range parameters prior to a data transfer with minimal interaction. Counter control is thereafter transferred to hardware to accommodate a data transfer rate higher than that possible with firmware control.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A data transfer control system in a peripheral control unit having a scratchpad memory unit and a hardware control means, said control system having architecture accommodating both the loading of memory address, range and offset range parameters in a serial stream, and the dynamic amending of said parameters during a data transfer between a disk device and a main memory unit of a data processing system wherein said peripheral control unit and said main memory unit are electrically coupled by an asynchronous communication bus, which comprises:

a. a memory address counter responsive to said hardware control means for dynamically updating memory address information to said bus during a data transfer;
 b. a range counter electrically connected to said memory address counter to form a serial data path and responsive to said hardware control means for indicating the completion of a data transfer to said hardware control means;
 c. an offset range counter electrically connected to said range counter in extension of said serial data path and responsive to said hardware control means for dynamically indicating to said hardware control means the occurrence of a first data byte in an information stream to be transferred; and
 d. firmware control means responsive to said hardware control means between data transfers for circulating a serial stream of said parameters through said scratchpad memory unit, said memory address counter, said range counter and said offset range counter, thereby storing control information in said scratchpad memory unit for reinitiating a data transfer in the event of a data transfer error.

2. A data transfer control system in a peripheral control unit of a data processing system having a main memory unit and said peripheral control unit electrically coupled to an asynchronous communication bus, said peripheral control unit in electrical communication with a disk device and including a scratchpad memory unit and a hardware control means, which comprises:

a. a clock means for autonomously supplying logic control signals to said control system at a clock rate;
 b. first logic means responsive to said clock means and said hardware control means for providing address control signals;
 c. second logic means responsive to said clock means and said hardware control means for providing range and offset range control signals;
 d. first counter means responsive to said address control signals for dynamically updating memory address signals to said main memory unit during a data transfer;
 e. second counter means responsive to said range control signals and in electrical communication with said first counter means to form a serial data path for indicating to said hardware control means the termination of said data transfer;
 f. third counter means responsive to said offset range control signals and in electrical communication with said second counter means in extension of said serial data path for dynamically indicating to said hardware control means the occurrence of a first data byte in an information stream to be transferred; and
 g. firmware control means in electrical communication with said hardware control means for circulating a data stream through said scratchpad memory unit and along said serial path to load said first, said second and said third counter means with memory address, range count and offset range count parameters, respectively, and to store said parameters between data transfers in said scratchpad memory unit to provide control signals for retransferring data in the event of a data transfer error.

3. A counter control system in a peripheral control unit having a scratchpad memory unit for accommodating high data transfer rates between a disk control unit and a main memory unit of a data processing system including a central processing unit, said main memory unit and said peripheral control unit electrically coupled to an asynchronous communication bus, which comprises:

a. hardware control means responsive to said disk control unit and to control information supplied by said central processing unit for controlling the transfer of data through said peripheral control unit;
 b. first counter means in electrical communication with said bus and responsive to said hardware control means during data transfers for providing memory addresses to said bus;

c. second counter means in serial electrical connection with said first counter means and responsive to said hardware control means during data transfers for indicating the end of a data transfer to said hardware control means;

d. third counter means in serial connection with said second counter means and responsive to said hardware control means during data transfers for indicating to said hardware control means the occurrence of a first data byte in an information stream to be transferred; and e. firmware control means responsive to said hardware control means for issuing load commands to said first, said second, and said third counter means between data transfers to serially shift information from said scratchpad memory through said counter control system to said scratchpad memory, thereby providing control information to reinitiate a data transfer in the event of a data transfer error.

4. A counter control system structure in a peripheral controller in electrical communication with a main memory and a central processing unit of a data processing system, said peripheral controller having a scratchpad memory for receiving data transfer control information from said main memory under control of said central processing unit, and a hardware control system for controlling the transfer of data into and out of said peripheral controller in response to said control information, said counter control system comprising:

(a) firmware control means responsive to said hardware control system for effecting the transfer of said control information between said counter control system and said scratchpad memory;

(b) first counter means responsive to a command issued from said firmware control means during time periods between data transfers for accommodating a serial transfer from said scratchpad memory of said control information including offset range count parameters indicating the commencement of a data transfer, range count parameters indicating the termination of a data transfer and memory address parameters indicating memory locations in said main memory for use by said hardware control system during data transfers;

(c) second counter means electrically connected to said first counter means to form a serial data path therewith, and responsive to said command for accommodating a serial transfer of said offset range count, range count and memory address parameters from said first counter means to said second counter means; and (d) third counter means electrically connected to said second counter means in extension of said serial data path, and in electrical communication with said scratchpad memory, and responsive to said command for accommodating a serial shift of said offset range count, range count and memory address parameters from said second counter means to said third counter means, and from said third counter means to said scratchpad memory, thereby completing a serial transfer loop between said scratchpad memory and said counter control system for accommodating the loading of said counter control system with said control information to initiate a data transfer, and with immediately preceding count information of said counter control system to accommodate the continuation of a data transfer in the event of a data transfer error, without substantially affecting data transfer rates.

* * * * *